US012726333B2

(12) United States Patent
Chatterjee et al.

(10) Patent No.: US 12,726,333 B2
(45) Date of Patent: Sep. 1, 2026

(54) HARDWARE-BASED KEY GENERATION AND STORAGE FOR CRYPTOGRAPHIC FUNCTION

(71) Applicant: INTERNATIONAL BUSINESS MACHINES CORPORATION, Armonk, NY (US)

(72) Inventors: Debapriya Chatterjee, Austin, TX (US); Silvia Melitta Mueller, St. Ingbert (DE); Maarten J. Boersma, Holzgerlingen (NL); Martijn Diede Berkers, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 364 days.

(21) Appl. No.: 17/857,627

(22) Filed: Jul. 5, 2022

(65) Prior Publication Data

US 2024/0015004 A1 Jan. 11, 2024

(51) Int. Cl.

*H04L 9/06* (2006.01)
*G06F 9/30* (2018.01)
*H04L 9/08* (2006.01)
*H04L 9/30* (2006.01)

(52) U.S. Cl.

CPC .......... *H04L 9/0631* (2013.01); *G06F 9/3013* (2013.01); *G06F 9/30141* (2013.01); *H04L 9/0816* (2013.01)

(58) Field of Classification Search

CPC .................................................... H04L 9/0631
See application file for complete search history.

(56) References Cited

U.S. PATENT DOCUMENTS 7,295,671 B2 11/2007 Snell
7,702,100 B2 4/2010 Han
7,783,037 B1 8/2010 Bong
8,042,025 B2 10/2011 Gopal
8,194,854 B2 6/2012 Gueron
(Continued)

FOREIGN PATENT DOCUMENTS

CN 1658550 A 8/2005
CN 101349968 A 1/2009
(Continued)

OTHER PUBLICATIONS

P202201607TW01 Office Action, Jul. 1, 2024, 4 pages, TW Patent Office (English Translation).
(Continued)

*Primary Examiner* — Noura Zoubair
(74) *Attorney, Agent, or Firm* — Cantor Colburn LLP; Edward Wixted

(57) ABSTRACT

A processor includes an instruction fetch unit that fetches instructions to be executed, an architected register file including a plurality of registers for storing source and destination operands, and an execution unit for executing a key-generating instruction. The execution unit includes a key generation circuit that, responsive to a key-generating instruction, iteratively applies a cryptographic function to a sequence of iteration inputs beginning with an encryption key obtained from the architected register file and stores, within the architected register file, a decryption key obtained from at least one iteration of the cryptographic function.

16 Claims, 12 Drawing Sheets

(56) References Cited

U.S. PATENT DOCUMENTS

| | | | |
|---|---|---|---|
| 8,340,280 | B2 | 12/2012 | Gueron |
| 8,913,740 | B2 | 12/2014 | Gueron |
| 10,129,018 | B2 | 11/2018 | Satpathy |
| 10,142,098 | B2 | 11/2018 | Suresh |
| 10,256,971 | B2 | 4/2019 | Gueron |
| 10,305,680 | B2 | 5/2019 | Gomes |
| 10,313,108 | B2 | 6/2019 | Suresh |
| 10,346,343 | B2 | 7/2019 | Suresh |
| 10,348,506 | B2 | 7/2019 | Greiner |
| 10,432,393 | B2 | 10/2019 | Gueron |
| 10,496,373 | B2 | 12/2019 | Suresh et al. |
| 10,581,593 | B2 | 3/2020 | Gomes |
| 10,877,753 | B2 | 12/2020 | Bradbury |
| 10,924,282 | B2 | 2/2021 | Brostrom |
| 11,121,856 | B2 | 9/2021 | Satpathy |
| 11,128,443 | B2 | 9/2021 | Gueron |
| 2002/0066014 | A1 | 5/2002 | Dworkin |
| 2003/0135530 | A1 | 7/2003 | Parthasarathy |
| 2004/0202317 | A1 | 10/2004 | Demjanenko |
| 2004/0252831 | A1 | 12/2004 | Uehara |
| 2004/0255130 | A1 | 12/2004 | Henry |
| 2005/0089160 | A1 | 4/2005 | Crispin |
| 2008/0240423 | A1 | 10/2008 | Gueron |
| 2008/0240426 | A1 | 10/2008 | Gueron et al. |
| 2009/0052659 | A1 | 2/2009 | Gueron |
| 2009/0141887 | A1 | 6/2009 | Yap |
| 2009/0310775 | A1 | 12/2009 | Gueron et al. |
| 2010/0049986 | A1 | 2/2010 | Watanabe |
| 2010/0070548 | A1 | 3/2010 | Gashkov et al. |
| 2010/0306293 | A1 | 12/2010 | Li et al. |
| 2011/0060782 | A1 | 3/2011 | Moharil et al. |
| 2011/0231636 | A1 | 9/2011 | Olson |
| 2011/0246548 | A1 | 10/2011 | Yen |
| 2011/0255689 | A1 | 10/2011 | Bolotov |
| 2014/0208079 | A1 | 7/2014 | Bradbury |
| 2015/0043729 | A1 | 2/2015 | Gopal |
| 2015/0067302 | A1 | 3/2015 | Gueron |
| 2015/0098563 | A1 | 4/2015 | Gulley |
| 2016/0119126 | A1* | 4/2016 | Shay ..................... H04L 9/0816 380/28 |
| 2017/0134163 | A1 | 5/2017 | Suresh |
| 2017/0373836 | A1 | 12/2017 | Rarick |
| 2018/0122271 | A1* | 5/2018 | Ghosh ................... H04L 9/0631 |
| 2018/0365021 | A1 | 12/2018 | Chen et al. |
| 2019/0197821 | A1 | 6/2019 | Hutchinson-Kay et al. |
| 2019/0205093 | A1 | 7/2019 | Suresh |
| 2019/0286443 | A1 | 9/2019 | Solomatnikov et al. |
| 2019/0319782 | A1 | 10/2019 | Ghosh |
| 2019/0386815 | A1* | 12/2019 | Satpathy ................. G06F 7/724 |
| 2020/0117811 | A1 | 4/2020 | Ghosh et al. |
| 2020/0134234 | A1 | 4/2020 | Lemay |
| 2021/0152330 | A1 | 5/2021 | Satpathy |
| 2021/0203504 | A1 | 7/2021 | Brandt |
| 2022/0206958 | A1* | 6/2022 | LeMay ............... G06F 12/0831 |
| 2023/0269076 | A1* | 8/2023 | Brandt .................. H04L 9/0822 713/189 |
| 2024/0012811 | A1 | 1/2024 | Dai et al. |
| 2024/0053963 | A1 | 2/2024 | Mueller et al. |
| 2024/0053989 | A1 | 2/2024 | Kumar et al. |
| 2024/0061961 | A1 | 2/2024 | Kumar et al. |

FOREIGN PATENT DOCUMENTS

| | | | |
|---|---|---|---|
| CN | 112152785 | A | 12/2020 |
| CN | 113485751 | A | 10/2021 |
| EP | 14490631 | A | 8/2004 |
| EP | 4569404 | A1 | 6/2025 |
| EP | 4569724 | A1 | 6/2025 |
| EP | 4569725 | A1 | 6/2025 |
| TW | 200536331 | A | 11/2005 |
| TW | 200845689 | A | 11/2008 |
| TW | 201135477 | A | 10/2011 |
| TW | 201203108 | A | 1/2012 |
| TW | 201332329 | A | 8/2013 |
| TW | 201519623 | A | 5/2015 |
| TW | 201636829 | A | 10/2016 |
| TW | 201717573 | A | 5/2017 |
| TW | 202201165 | A | 1/2022 |

OTHER PUBLICATIONS

Adams, A. et al., "Cryptography Acceleration in a RISC-V GPGPU," CARRV 2021, Jun. 17, 2021, 7 pages.

Advanced Encryption Standard (AES), Nov. 26, 2001, pp. 1-51, FIPS PUB 197, National Institute of Standards and Technology (NIST), US.

Anonymous, "Method of Early Detection and Halting of Ransomware Attacks," IPCOM000268682D, ip.com, Feb. 15, 2022, 5 pages.

Anonymous, "A Method To Reduce Stick Table Synchronization Storm Among Load Balancer Cluster," IPCOM000268809D, Mar. 1, 2022, 6 pages, ip.com.

Anonymous, "Method and System for Prevention of Anti-Tampering of Media Content," IPCOM000259235D, Jul. 22, 2019, 4 pages, ip.com.

Anonymous, "Method of Flash Acceleration in Replication for Consistent Hash Ring," Mar. 13, 2016, 9 pages, IPCOM000245503D, ip.com.

Anonymous, "Parallelizable Hashing Algorithm," IPCOM000254123D, Jun. 4, 2018, 2 pages, ip.com.

Bos, J.W. et al., Performance Analysis of the SHA-3 Candidates On Exotic Multi-Core Architectures, CHES 2010 12th International Workshop, Aug. 17-20, 2010, 15 pages, Santa Barbara, CA.

Dworkin, M., "Recommendation for Block Cipher Modes of Operation: Galois/Counter Mode (GCM) and GMAC," NIST Special Publication SP800-38D, Nov. 2007, 39 pages, National institute for Standards and Technology, Gaithersburg, MD.

Ghosh, Moinak, "Optimizing Rolling Hash Computation Using SIMD Vector Registers," IPCOM000226555D, Apr. 16, 2013, 4 pages, ip.com.

Gueron, S. et al., "Intel Carry-Less multiplication instruction and its usage for computing GCM Mode," May 2010, 76 pages, Intel Corporation.

Gulley, S. et al., "Intel SHA Extensions: New Instructions Supporting the Secure Hash Algorithm on Intel Architecture Processors," Jul. 2013, 22 pages, Intel Corporation.

IEEE standard: 1619-2018, "IEEE Standard for Cryptographic Protection of Data on Block-Oriented Storage Devices," Oct. 23, 2018, 41 pages, IEEE, New York, NY.

International Searching Authority of European Patent Office, International Search Report and Written Opinion, International Application No. PCT/EP2023/068147, Oct. 4, 2023, 14 pages.

Jang, K. et al., "SSL SHADER: Cheap SSL Acceleration With Commodity Processors," 8th USENIX Symposium on Networked Systems Design and Implementation, Mar. 2011, 14 pages, USENIX Association, Boston, MA.

Keller, S. et al., "Secure Hash Algorithm 3 Validation System (SHA3VS)," Jan. 29, 2016, 33 pages, National Institute of Standards and Technology, USA.

Mcgrew, D. et al., "The Galois/Counter Mode of Operation," Feb. 2004, 43 pages.

NIST FIPS 180-4 "Secure Hash Standard," Aug. 2015, 37 pages, National Institute of Standards and Technology, Gaithersburg, MD.

NIST FIPS 202 "SHA-3 Standard: Permutation-Based Hash and Extendable-Output Functions," Aug. 2015, 37 pages, National Institute of Standards and Technology, Gaithersburg, MD.

Rachh, Rashmi, et al., "Implementation of AES Key Schedule Using Look-Ahead Technique," Circuits, Systems, and Signal Processing 33.11(2014): 3663-3670.

Salehani, Y. et al., "NESHA-256, New 256-BIT Secure Hash Algorithm," Cryptology ePrint Archive, Paper 2009/033, 2009, 16 pages, https://eprint.iacr.org/2009/033.

Appendix P, List of IBM Applications Treated as Related, 2 pages.

Bertoni, Guido et al., "KangarooTwelve: fast hashing based on Keccak-p." IACR Cryptology ePrint Archive (2018), 19 pages.

(56) References Cited

OTHER PUBLICATIONS

Dworkin, M., "SHA-3 Standard: Permutation-Based Hash and Extendable-Output Functions NIST FIPS 202," Aug. 2015, 37 pages, National Institute of Standards and Technology, Gaithersburg, MD.
Y. Akiya et al., "SHA-3-LPHP: Hardware Acceleration of SHA-3 for Low-Power High-Performance Systems," 2021 IEEE International Symposium on Software Reliability Engineering Workshops (ISSREW), Wuhan, China, 2021, pp. 393-398, doi: 10.1109/ISSREW53611.2021.00107.
Taiwan Intellectual Property Bureau, Notice of Allowance in P202201845TW01 (English translation), Aug. 23, 2024, 6 pages.
Taiwan IPO, P202201322TW01 Office Action, Jun. 14, 2024, 20 pages (English translation).
Taiwan IPO, P202201845TW01 Office Action, Jun. 12, 2024, 4 pages (English Translation).
International Searching Authority of European Patent Office, International Search Report and Written Opinion, International Application No. PCT/EP2023/071362, Oct. 18, 2023, 13 pages.
Y. Chen et al., "A programmable Galois Field processor for the Internet of Things," 2017 ACM/IEEE 44th Annual International Symposium on Computer Architecture (ISCA), Toronto, ON, Canada, 2017, pp. 55-68, doi: 10.1145/3079856.3080227.
International Searching Authority, Notification of Transmittal of the International Search Report and the Written Opinion of the International Searching Authority, Nov. 11, 2023, 12 pages, International Application No. PCT/EP2023/071370.
International Searching Authority, Notification of Transmittal of the International Search Report and the Written Opinion of the International Searching Authority, Nov. 6, 2023, 12 pages, International Application No. PCT/EP2023/071369.
TW IPO, Notice of Allowance for P202301322TW01, Sep. 26, 2024, 6 pages (English translation).
Pittalia, P. P. (2019), A comparative study of hash algorithms in cryptography, International Journal of Computer Science and Mobile Computing, 8(6), 147-152 (2019).
TW IPO, Office Action for P202201845TW01, Jan. 24, 2024, 9 pages.

* cited by examiner

HARDWARE-BASED KEY GENERATION AND STORAGE FOR CRYPTOGRAPHIC FUNCTION

BACKGROUND OF THE INVENTION

The present invention relates in general to data processing and, in particular, to efficiently obtaining of a key for performing a cryptographic function in processor hardware.

An important aspect of data security is the protection of data at rest (e.g., while stored in a data storage device) or data in transit (e.g., during transmission) through encryption. Generally speaking, encryption involves the conversion of unencrypted data (referred to as plaintext) to encrypted data (referred to as ciphertext) through the combination of the plaintext and one or more encryption keys utilizing an encryption function. To recover the plaintext from the ciphertext, the ciphertext is processed by a decryption function utilizing one or more decryption keys. Thus, encryption provides data security by requirement that an additional secret (i.e., the decryption key(s)) be known by a party prior to that party being able to access the protected plaintext.

In many implementations, data encryption is performed utilizing software executing on a general purpose processor. While the implementation of encryption in software provides the advantages of being able to select differing encryption functions and easily adapting a selected encryption algorithm to use various lengths of plaintext and encryption keys, performing encryption in software has the concomitant disadvantage of relatively poor performance. As the volumes of data sets continue to dramatically increase in the era of "big data," the performance achieved by software-implemented encryption can be unacceptable when encrypting large data sets. Accordingly, it is often desirable to provide support for encryption in hardware to achieve improved performance.

BRIEF SUMMARY

In some encryption techniques, one or more keys generated in the process of encrypting plaintext into ciphertext are required to decrypt the ciphertext. In some prior art implementations, a decryption process must re-generate the one or more keys prior to beginning decryption of the ciphertext, slowing the decryption process.

The present disclosure appreciates that a decryption process can be accelerated by storing, in an architected register of a processor, one or more keys generated during an encryption process, thus making that key available at low latency in advance of a decryption process. In at least one embodiment, the key is generated and stored by the processor through execution of a key-generating instruction.

In one embodiment, a processor includes an instruction fetch unit that fetches instructions to be executed, an architected register file including a plurality of registers for storing source and destination operands, and an execution unit for executing a key-generating instruction. The execution unit includes a key generation circuit that, responsive to a key-generating instruction, iteratively applies a cryptographic function to a sequence of iteration inputs beginning with an encryption key obtained from the architected register file and stores, within the architected register file, a decryption key obtained from at least one iteration of the cryptographic function. Such a processor can form part of a larger data processing system including multiple processors coupled by a system interconnect to a shared memory system.

In one embodiment, a method of data processing includes fetching, by an instruction fetch unit of a processor, one or more instructions to be executed by the processor, where the instructions include a key-generating instruction. Based on receiving the key-generating instruction, an execution unit of the processor executes the key-generating instruction. Executing the key-generating instruction includes the execution unit iteratively applying a cryptographic function to a sequence of iteration inputs beginning with an encryption key obtained from an architected register file of the processor and storing, within the architected register file, a decryption key obtained from at least one iteration of the cryptographic function.

In some embodiments, the key-generating instruction includes a mode field specifying one of a plurality of modes each corresponding to a respective one of a plurality of different lengths of decryption keys, and the execution unit is configured to generate the decryption key with any of the plurality of different lengths based on the mode field of the key-generating instruction.

In some embodiments, the key-generating instruction includes a mode field specifying one of a plurality of modes each corresponding to a respective one of a plurality of different lengths of decryption keys, and the execution unit is configured to generate the decryption key utilizing differing numbers of iterations of the cryptographic function based on the mode field of the key-generating instruction.

In some embodiments, the key-generating instruction includes an operand field indicating one or more source registers in the architected register file for storing the encryption key and one or more destination registers in the architected register file for storing the decryption key. The execution unit can be configured to store the decryption key in one or more destination registers of the architected register file selected based on the operand field of the key-generating instruction.

In some embodiments, the cryptographic function comprises Advanced Encryption Standard.

In some embodiments, the execution unit is further configured, based on receipt of a decryption instruction, to access the decryption key from the architected register file and decrypt ciphertext utilizing the decryption key.

In some embodiments, a processor design including one or more of the foregoing features can be expressed in a design structure tangibly embodied in a machine-readable storage device for designing, manufacturing, or testing an integrated circuit.

DETAILED DESCRIPTION

Figure 1:
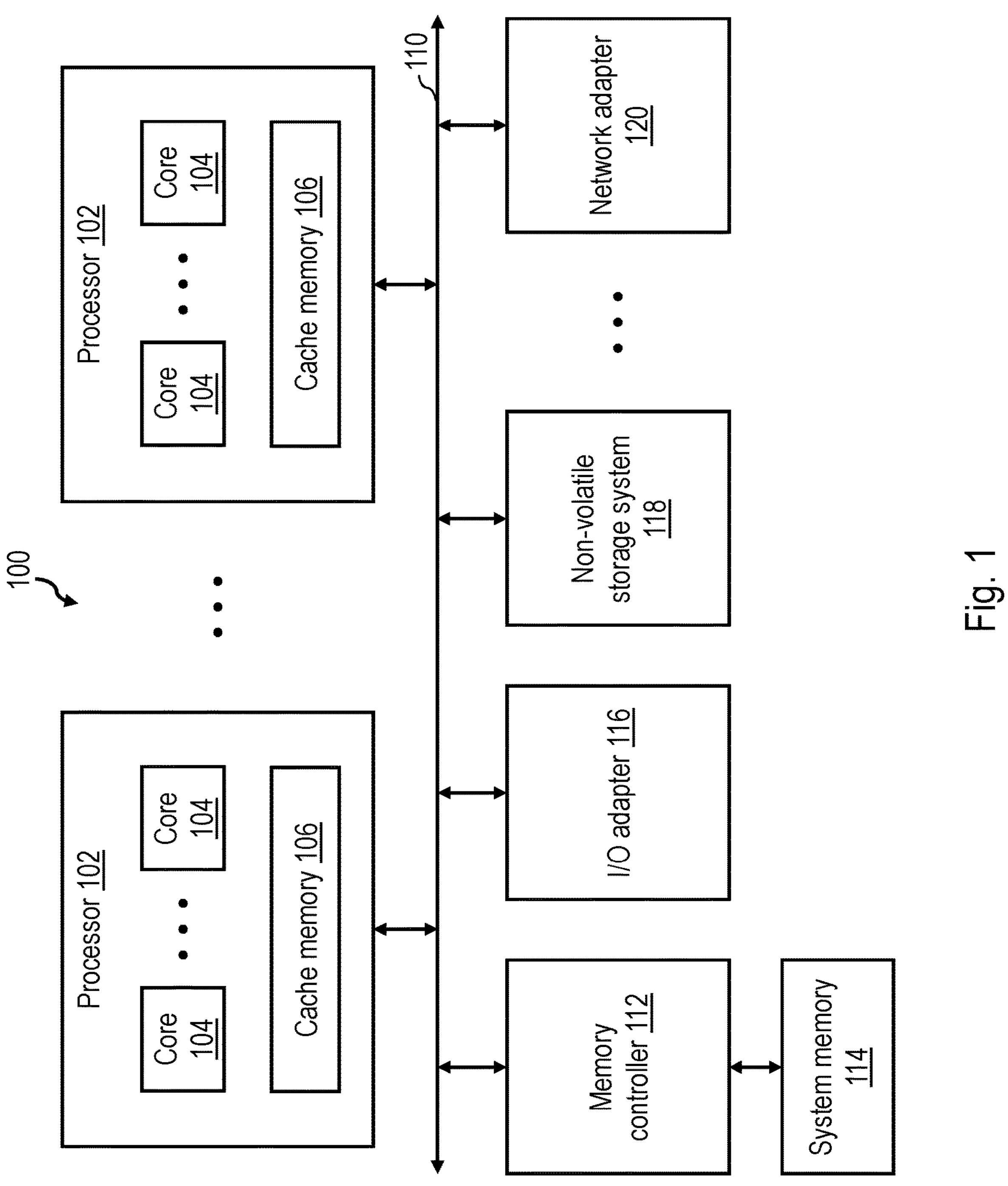
FIG. 1 is a high-level block diagram of a data processing system including a processor in accordance with one embodiment.

With reference now to the figures and in particular with reference to FIG. 1, there is illustrated a high-level block diagram of a data processing system 100 in accordance with one embodiment. In some implementations, data processing system 100 can be, for example, a server computer system (such as one of the POWER series of servers available from International Business Machines Corporation), a mainframe computer system, a mobile computing device (such as a smartphone or tablet), a laptop or desktop personal computer system, or an embedded processor system.

As shown, data processing system 100 includes one or more processors 102 that process instructions and data. Each processor 102 may be realized as a respective integrated circuit having a semiconductor substrate in which integrated circuitry is formed, as is known in the art. In at least some embodiments, processors 102 can generally implement any one of a number of commercially available processor architectures, for example, POWER, ARM, Intel x86, NVidia, Apple silicon, etc. In the depicted example, each processor 102 includes one or more processor cores 104 and cache memory 106 providing low latency access to instructions and operands likely to be read and/or written by processor cores 104. Processors 102 are coupled for communication by a system interconnect 110, which in various implementations may include one or more buses, switches, bridges, and/or hybrid interconnects.

Data processing system 100 may additionally include a number of other components coupled to system interconnect 110. These components can include, for example, a memory controller 112 that controls access by processors 102 and other components of data processing system 100 to a system memory 114. In addition, data processing system 100 may include an input/output (I/O) adapter 116 for coupling one or I/O devices to system interconnect 110, a non-volatile storage system 118, and a network adapter 120 for coupling data processing system 100 to a communication network (e.g., a wired or wireless local area network and/or the Internet).

Those skilled in the art will additionally appreciate that data processing system 100 shown in FIG. 1 can include many additional non-illustrated components. Because such additional components are not necessary for an understanding of the described embodiments, they are not illustrated in FIG. 1 or discussed further herein. It should also be understood, however, that the enhancements described herein are applicable to data processing systems and processors of diverse architectures and are in no way limited to the generalized data processing system architecture illustrated in FIG. 1.

Figure 2:
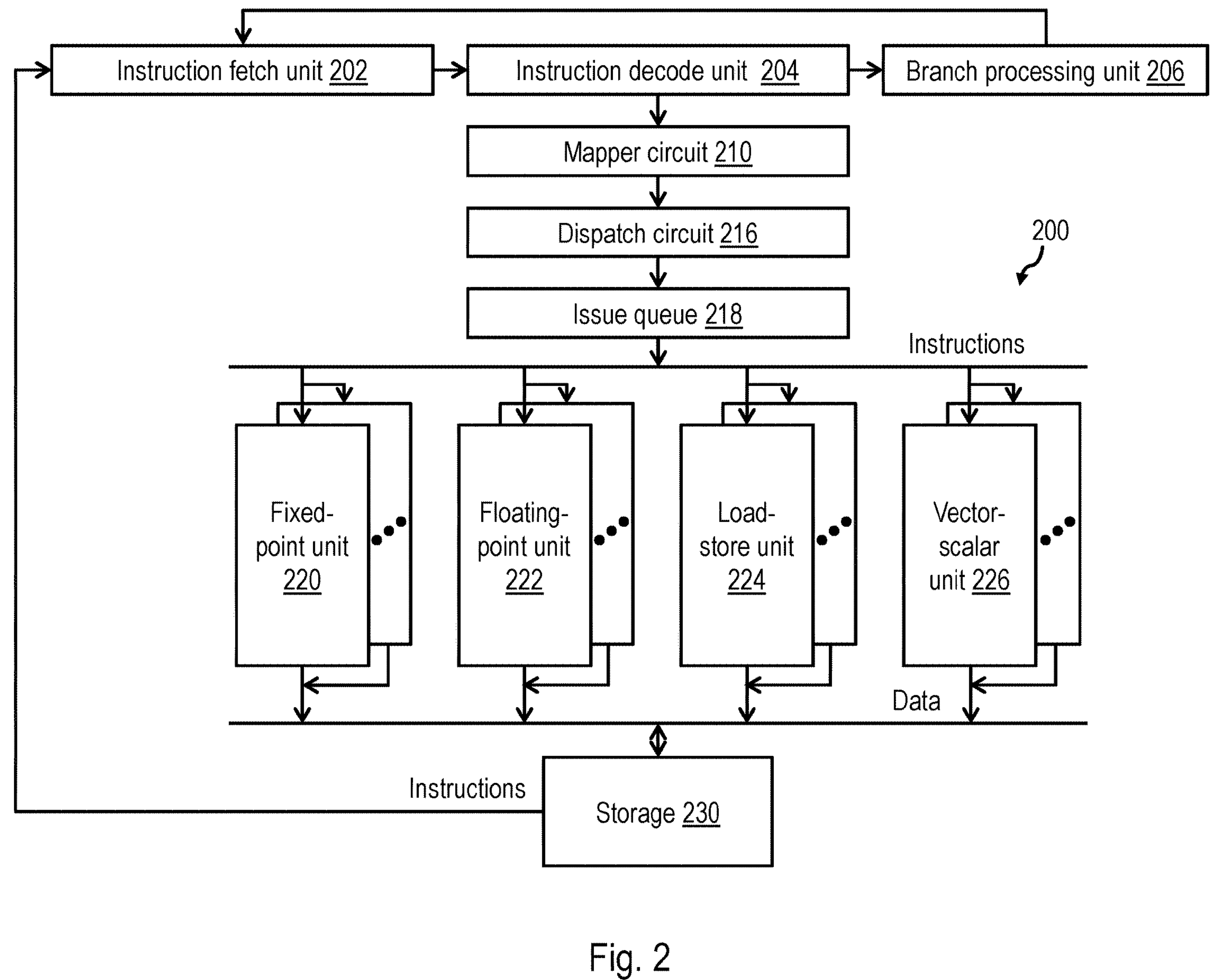
FIG. 2 is a high-level block diagram of a processor core in accordance with one embodiment.

Referring now to FIG. 2, there is depicted a high-level block diagram of an exemplary processor core 200 in accordance with one embodiment. Processor core 200 may be utilized to implement any of processor cores 104 of FIG. 1.

In the depicted example, processor core 200 includes an instruction fetch unit 202 for fetching instructions within one or more streams of instructions from storage 230 (which may include, for example, cache memories 106 and/or system memory 114 from FIG. 1). In a typical implementation, each instruction has format defined by the instruction set architecture of processor core 200 and includes at least an operation code (opcode) field specifying an operation (e.g., fixed-point or floating-point arithmetic operation, vector operation, matrix operation, logical operation, branch operation, memory access operation, cryptographic operation, etc.) to be performed by processor core 200. Certain instructions may additionally include one or more operand fields directly specifying operands or implicitly or explicitly referencing one or more registers storing source operand(s) to be utilized in the execution of the instruction and one or more registers for storing destination operand(s) generated by execution of the instruction. Instruction decode unit 204, which in some embodiments may be merged with instruction fetch unit 202, decodes the instructions retrieved from storage 230 by instruction fetch unit 202 and forwards branch instructions that control the flow of execution to branch processing unit 206. In some embodiments, the processing of branch instructions performed by branch processing unit 206 may include speculating the outcome of conditional branch instructions. The results of branch processing (both speculative and non-speculative) by branch processing unit 206 may, in turn, be utilized to redirect one or more streams of instruction fetching by instruction fetch unit 202.

Instruction decode unit 204 forwards instructions that are not branch instructions (often referred to as "sequential instructions") to mapper circuit 210. Mapper circuit 210 is responsible for the assignment of physical registers within the register files of processor core 200 to instructions as needed to support instruction execution. Mapper circuit 210 preferably implements register renaming. Thus, for at least some classes of instructions, mapper circuit 210 establishes transient mappings between a set of logical (or architected) registers referenced by the instructions and a larger set of physical registers within the register files of processor core 200. As a result, processor core 200 can avoid unnecessary serialization of instructions that are not data dependent, as might otherwise occur due to the reuse of the limited set of architected registers by instructions proximate in program order.

Still referring to FIG. 2, processor core 200 additionally includes a dispatch circuit 216 configured to ensure that any data dependencies between instructions are observed and to dispatch sequential instructions as they become ready for execution. Instructions dispatched by dispatch circuit 216 are temporarily buffered in an issue queue 218 until the execution units of processor core 200 have resources available to execute the dispatched instructions. As the appropriate execution resources become available, issue queue

218 issues instructions from issue queue 218 to the execution units of processor core 200 opportunistically and possibly out-of-order with respect to the original program order of the instructions.

In the depicted example, processor core 200 includes several different types of execution units for executing respective different classes of instructions. In this example, the execution units include one or more fixed-point units 220 for executing instructions that access fixed-point operands, one or more floating-point units 222 for executing instructions that access floating-point operands, one or more load-store units 224 for loading data from and storing data to storage 230, and one or more vector-scalar units 226 for executing instructions that access vector and/or scalar operands. In a typical embodiment, each execution unit is implemented as a multi-stage pipeline in which multiple instructions can be simultaneously processed at different stages of execution. Each execution unit preferably includes or is coupled to access at least one register file including a plurality of physical registers for temporarily buffering operands accessed in or generated by instruction execution.

Those skilled in the art will appreciate that processor core 200 may include additional unillustrated components, such as logic configured to manage the completion and retirement of instructions for which execution by execution units 220-226 is finished. Because these additional components are not necessary for an understanding of the described embodiments, they are not illustrated in FIG. 2 or discussed further herein.

Figure 3:
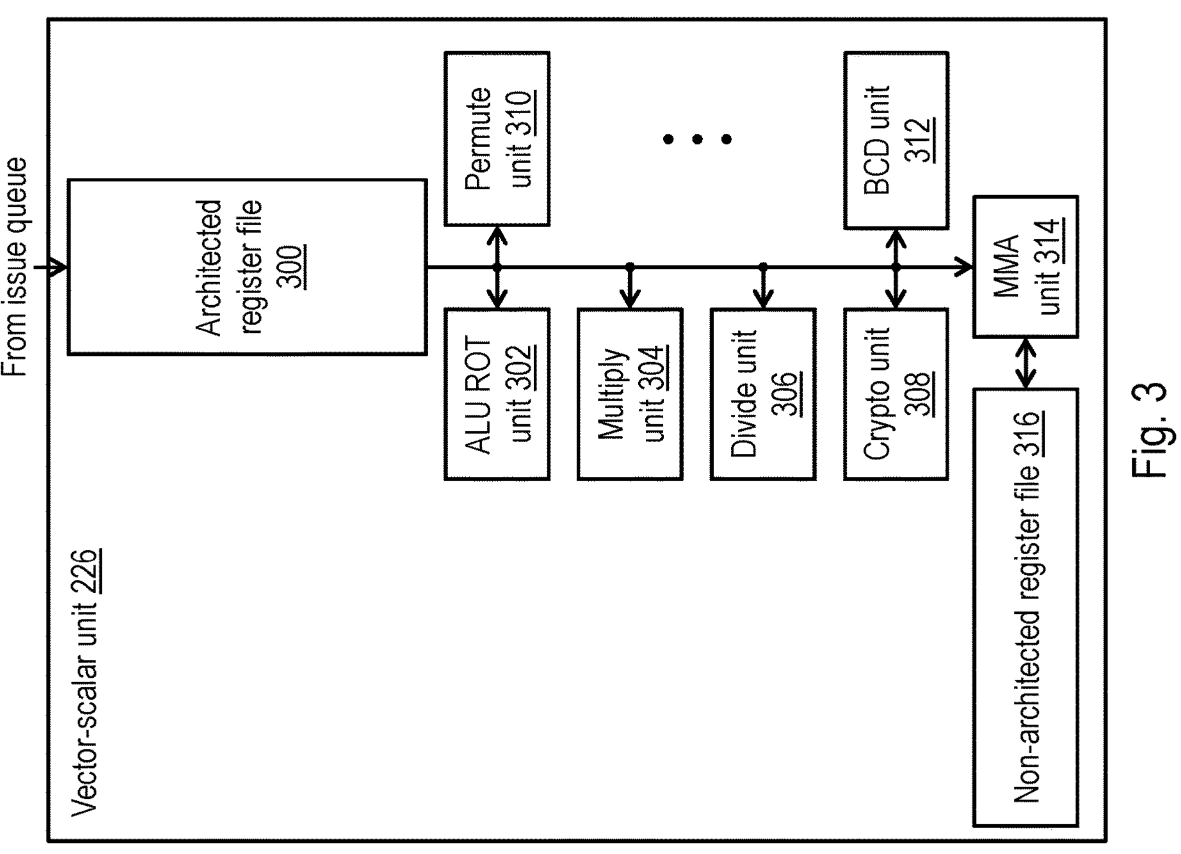
FIG. 3 is a high-level block diagram of an exemplary execution unit of a processor core in accordance with one embodiment.

With reference now to FIG. 3, there is illustrated a high-level block diagram of an exemplary execution unit of a processor 102 in accordance with one embodiment. In this example, a vector-scalar unit 226 of processor core 200 is shown in greater detail. In the embodiment of FIG. 3, vector-scalar unit 226 is configured to execute multiple different classes of instructions that operate on and generate different types of operands. For example, vector-scalar unit 226 is configured to execute a first class of instructions that operate on vector and scalar source operands and that generate vector and scalar destination operands. Vector-scalar unit 226 executes instructions in this first class of instructions in functional units 302-312, which in the depicted embodiment include an arithmetic logic unit/rotation unit 302 for performing addition, subtraction, and rotation operations, a multiply unit 304 for performing binary multiplication, a divide unit 306 for performing binary division, a cryptography unit 308 for performing cryptographic functions, a permute unit 310 for performing operand permutations, and binary-coded decimal (BCD) unit 312 for performing decimal mathematical operations. The vector and scalar source operands on which these operations are performed and the vector and scalar destination operands generated by these operations are buffered in the physical registers of an architected register file 300.

In this example, vector-scalar unit 226 is additionally configured to execute a second class of instructions that operate on matrix operands and that generate matrix operands. Vector-scalar unit 226 executes instructions in this second class of instructions in a matrix multiply-accumulate (MMA) unit 314. The matrix operands on which these operations are performed and the matrix operands generated by these operations are buffered and accumulated in the physical registers of a non-architected register file 316.

In operation, instructions are received by vector-scalar unit 226 from issue queue 218. If an instruction is in the first class of instructions (e.g., vector-scalar instructions), the relevant source operand(s) for the instruction are accessed in architected register file 300 utilizing the mapping between logical and physical registers established by mapper circuit 210 and then forwarded with the instruction to the relevant one of functional units 302-312 for execution. The destination operand(s) generated by that execution are then stored back to the physical register(s) of architected register file 300 determined by the mapping established by mapper circuit 210. If, on the other hand, the instruction is in the second class of instructions (e.g., MMA instructions), the instruction is forwarded to MMA unit 314 for execution with respect to operand(s) buffered in specified physical registers of non-architected register file 316. In this case, the execution by MMA unit 314 includes performing a matrix multiplication operation followed by accumulation (e.g., summing) of the resulting product with the contents of one or more specified physical registers in non-architected register file 316.

Figure 4:
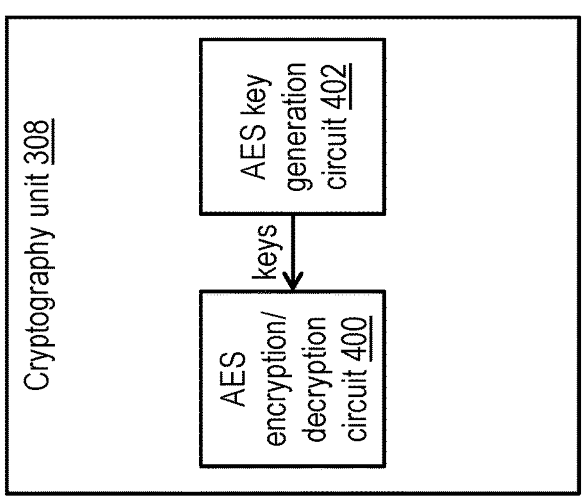
FIG. 4 is a more detailed block diagram of a cryptography unit within a processor core in accordance with one embodiment.

Referring now to FIG. 4, there is depicted a more detailed block diagram of an exemplary cryptography unit 308 in accordance with one embodiment. In this example, cryptography unit 308 includes circuitry for performing encryption and decryption according to the AES (Advanced Encryption Standard) in hardware. AES is defined, for example, in International Organization for Standardization (ISO)/International Electrotechnical Commission (IEC) Standard 18033-3, $2^{d}$ Ed., Dec. 15, 2010, which is incorporated herein by reference. As shown, this circuitry includes an AES encryption/decryption circuit 400 that combines encryption keys with plaintext to obtain ciphertext and that combines decryption keys with ciphertext to obtain plaintext. The circuit of cryptography unit 308 additionally includes AES key generation circuit 402, which, as explained in detail below, generates the keys utilized by AES encryption/decryption circuit 400 to encrypt and decrypt data.

Figure 5:
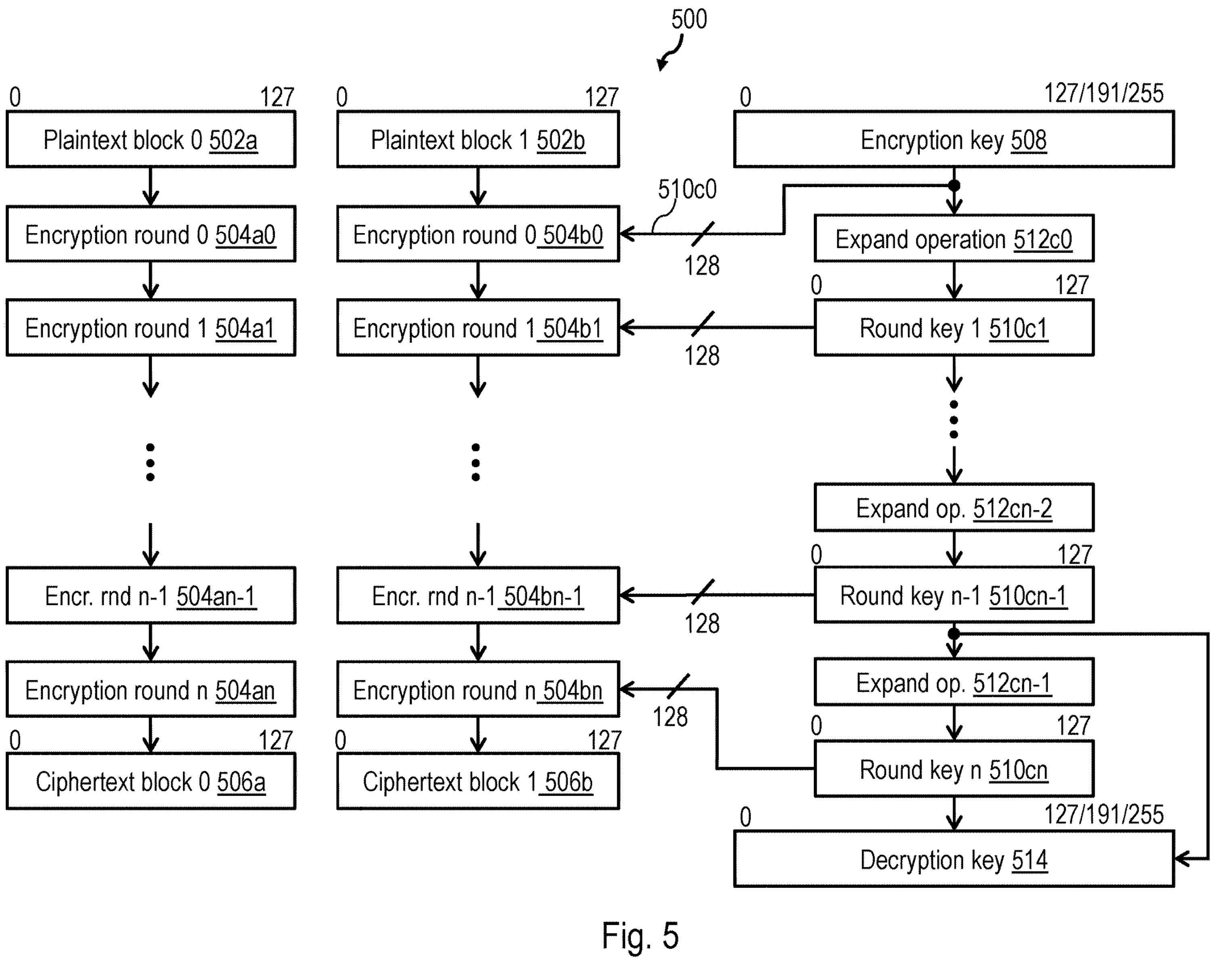
FIG. 5 is a time-space diagram of encryption in accordance with AES (Advanced Encryption Standard)

With reference now to FIG. 5, there is illustrated a time-space diagram of an encryption process 500 in accordance with AES. Encryption process 500 begins with an up to 256-bit plaintext string, which can be buffered in two 128-bit architected registers of architected register file 300 (referred to herein as XA, XA+1) and is identified in FIG. 5 as plaintext block 0 502*a* and plaintext block 1 502*b*. Encryption process 500 additionally begins with an encryption key 508, which in accordance with differing implementations of AES can have a length of 128 bits, 192 bits, or 256 bits. Since AES is defined to operate on 128-bit data blocks, each of plaintext block 0 502*a* and plaintext block 1 502*b* is separately processed in n+1 rounds of encryption, where n equals 10, 12, or 14 for an initial 128-bit, 192-bit, or 256-bit encryption key 508, respectively. Thus, plaintext block 0 502*a* is sequentially processed in encryption round 0 504*a*0, encryption round 1 504*a*1, . . . , encryption round n−1 504*an*−1, and encryption round n 504*an* to obtain a 128-bit ciphertext block 0 506*a*. Similarly, plaintext block 1 502*b* is sequentially processed in encryption round 0 504*b*0, encryption round 1 504*b*1, . . . , encryption round n−1 504*bn*−1, and encryption round n 504*bn* to obtain a 128-bit ciphertext block 1 506*b*. In each encryption round, the input data, that is, the input plaintext block or results of the previous encryption round, is logically combined with a respective different one of n+1 128-bit round keys.

Encryption key 508 may be conveniently supplied within two 128-bit architected registers of architected register file 300 (referred to herein as XB, XB+1). For initial encryption round 0 504*a*0 and round 0 504*b*0, 128-bits of encryption key 508 are selected to form a round key 0 510*c*0. Round keys for subsequent rounds (e.g., round key 1 510*c*1, . . . , round key n−1 510*cn*−1, and round key n 510*cn*) are generated from the previous round keys by a respective one of expand operations 512*c*0 to 512*cn*−1 defined by AES. Words from round key n 510*cn*, and in 192-bit and 256-bit implementations, additional words from round key n−1 510*cn*−1, are then utilized to form a decryption key 514, which is required to decrypt the ciphertext (i.e., ciphertext block 0 506*a* and ciphertext block 1 506*b*) produced by encryption process 500. Decryption key 514 has a same length as encryption key 508.

Figure 6:
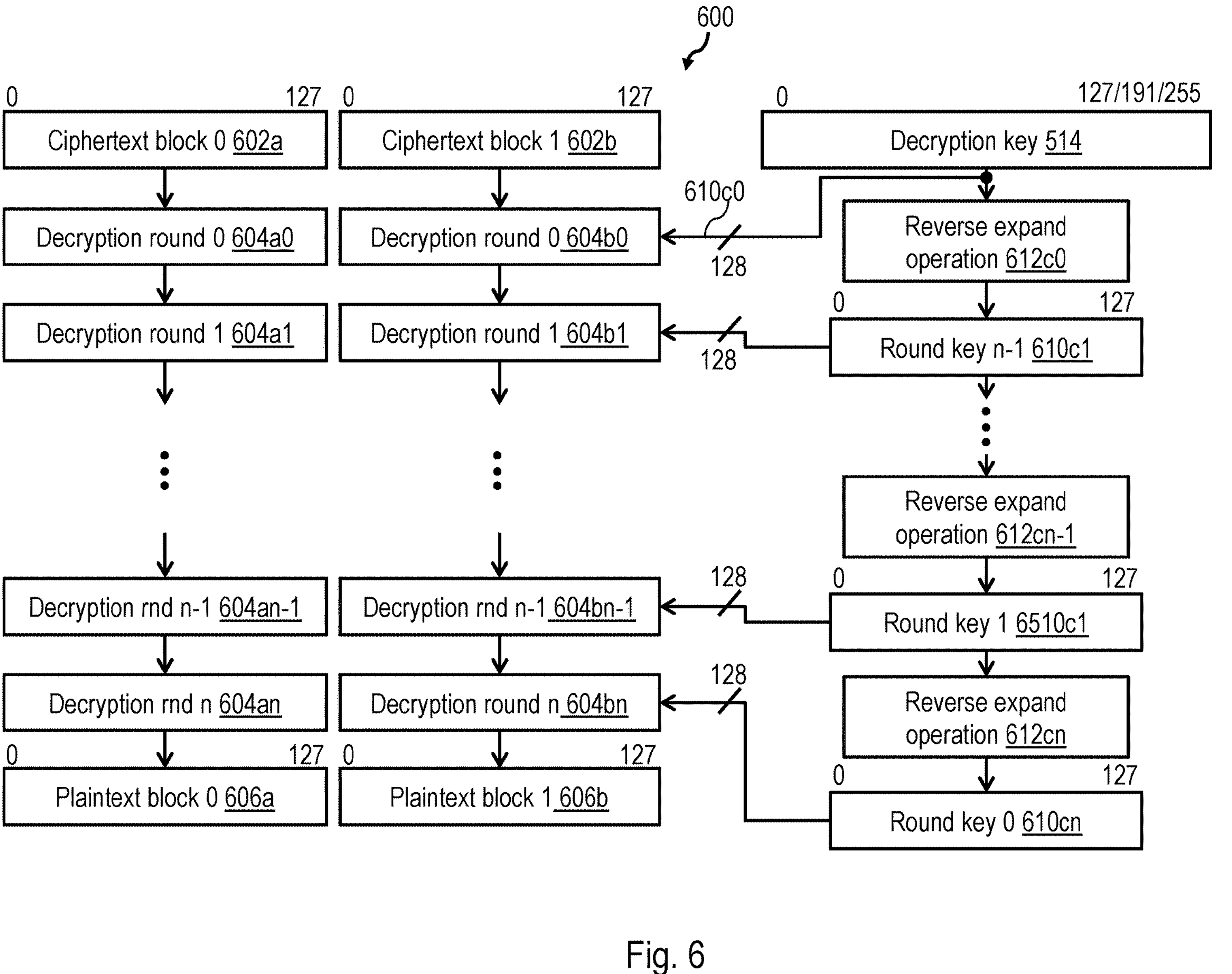
FIG. 6 is a time-space diagram of decryption in accordance with AES.

Referring now to FIG. 6, there is depicted a time-space diagram of a decryption process 600 in accordance with AES. Decryption process 600, which is symmetric with encryption process 500, begins with a 256-bit ciphertext string buffered in two 128-bit architected registers XA, XA+1 of architected register file 300 and identified in FIG. 6 as ciphertext block 0 602*a* and ciphertext block 1 602*b*. Decryption process 600 additionally begins with the decryption key 514 produced by encryption process 500. During decryption process 600, each of ciphertext block 0 602*a* and ciphertext block 1 602*b* is separately processed in n+1 rounds of decryption, where n equals 10, 12, or 14 for an initial 128-bit, 192-bit, or 256-bit decryption key 514, respectively. Thus, ciphertext block 0 602*a* is sequentially processed in decryption round 0 604*a*0, decryption round 1 604*a*1, . . . , decryption round n−1 604*an*−1, and decryption round n 604*an* to obtain a 128-bit plaintext block 0 606*a*. Similarly, ciphertext block 1 602*b* is sequentially processed in decryption round 0 604*b*0, decryption round 1 604*b*1, . . . , decryption round n−1 604*bn*−1, and decryption round n 604*bn* to obtain a 128-bit plaintext block 1 606*b*. In each decryption round, the input data, that is, the input 128-bit ciphertext block or results of the previous decryption round, is logically combined with a respective different one of n+1 128-bit round keys.

In decryption process 600, initial decryption key 514 can be provided, for example, in two 128-bit architected registers XB, XB+1 of architected register file 300. For initial decryption round 0 604*a*0 and decryption round 0 604*b*0, 128-bits of decryption key 514 are selected to form round key n 610*c*0. Round keys for subsequent decryption rounds (e.g., round key n−1 610*c*1, . . . , round key 1 610*cn*−1, and round key 0 610*cn*) are generated from the previous round keys by a respective one of reverse expand operations 612*c*0 to 612*cn*−1 defined by AES. In this manner, plaintext block 0 606*a*, which matches original plaintext block 0 502*a*, and plaintext block 1 606*b*, which matches original plaintext block 0 502*b*, can be recovered from ciphertext blocks 602*a*, 602*b* as long as decryption key 514 is known.

Figure 7:
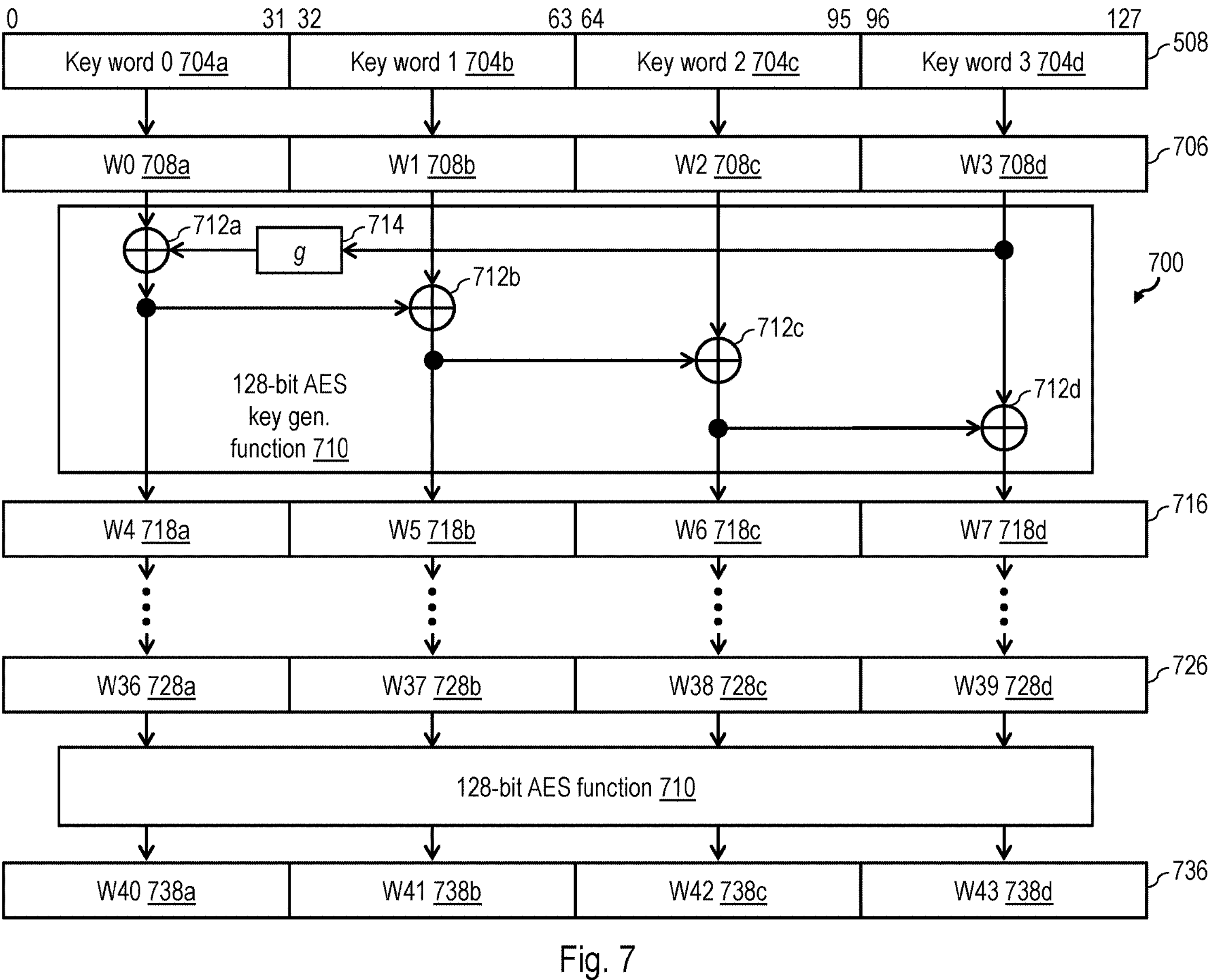
FIG. 7 is a data flow diagram of an AES key generation process for generating 128-bit round keys from an initial 128-bit encryption key in accordance with one embodiment.

With reference now to FIG. 7, there is illustrated a more detailed data flow diagram of an AES key generation process 700 for generating 128-bit round keys 510 from an initial 128-bit encryption key 508 in accordance with one embodiment. The reverse of the illustrated data flow can be employed to generate round keys 610 for a 128-bit implementation of the decryption process 600 of FIG. 6.

Key generation process 700 begins with a 128-bit initial encryption key 508. Initial encryption key 508 includes four 32-bit key words, namely, key word 0 704*a*, key word 1 704*b*, key word 2 704*c*, and key word 3 704*d*. In this 128-bit embodiment, key word 0 704*a*, key word 1 704*b*, key word 2 704*c*, and key word 3 704*d* respectively form the four 32-bit words W0 708*a*, W1 708*b*, W2 708*c*, W3 708*d* of an initial round key 706 (i.e., round key 0 510*c*0). Initial round key 706 is received as an input of a 128-bit AES function 710, which, in the forward direction employed in encryption process 500, performs expand operation 512. (In the reverse direction, the same logic can be employed to perform reverse expand operation 612 in decryption process 600.)

The 128-bit AES function 710 includes, for each 32-bit "lane," a respective one of 32-bit XOR functions 712*a*-712*d* that performs an exclusive OR of a respective word of the previous round key and bits derived from another lane in order to produce a word of a round key for a subsequent round. In this example, XOR function 712*b* performs a 32-bit exclusive OR of word W1 708*b* with the output of XOR function 712*a* to obtain word W5 718*b* of round key 716 (i.e., round key 1 510*c*1). Similarly, XOR function 712*c* performs a 32-bit exclusive OR of word W2 708*c* with the output of XOR function 712*b* to obtain word W6 718*c* of round key 716, and XOR function 712*d* performs a 32-bit exclusive OR of word W3 708*d* with the output of XOR function 712*c* to obtain word W7 718*c* of round key 716. In the first 32-bit lane, XOR function 712*a* performs a 32-bit exclusive OR of word W0 708*a* with the 32-bit output of function g 714, a bit scrambling function defined by AES that receives word W3 708*d* as input, to obtain word W4 718*a* of round key 716.

The process depicted in FIG. 7 continues iteratively to generate additional round keys, including penultimate round key 726 (comprising 32-bit words W36 728*a*, W37 728*b*, W38 728*c*, and W39 728*d*) and final round key 736 (including 32-bit words W40 738*a*, W41 738*b*, W42 738*c*, and W43 738*d*). In total, key generation process 700 of FIG. 7 generates 11 round keys for use in encryption process 500. In accordance with the present invention, the output of the final iteration of 128-bit AES function 710 (i.e., 32-bit words W40 738*a*, W41 738*b*, W42 738*c*, and W43 738*d*) in the encryption process 500, which forms the decryption key 514 utilized in decryption process 600, is retained and buffered within register XB among architected registers 300, as generally shown at reference numeral 1000 of FIG. 10A. Those skilled in the art will appreciate that the particular ordering of the bits and bytes within architected register XB is arbitrary and can vary between implementations.

Figure 8:
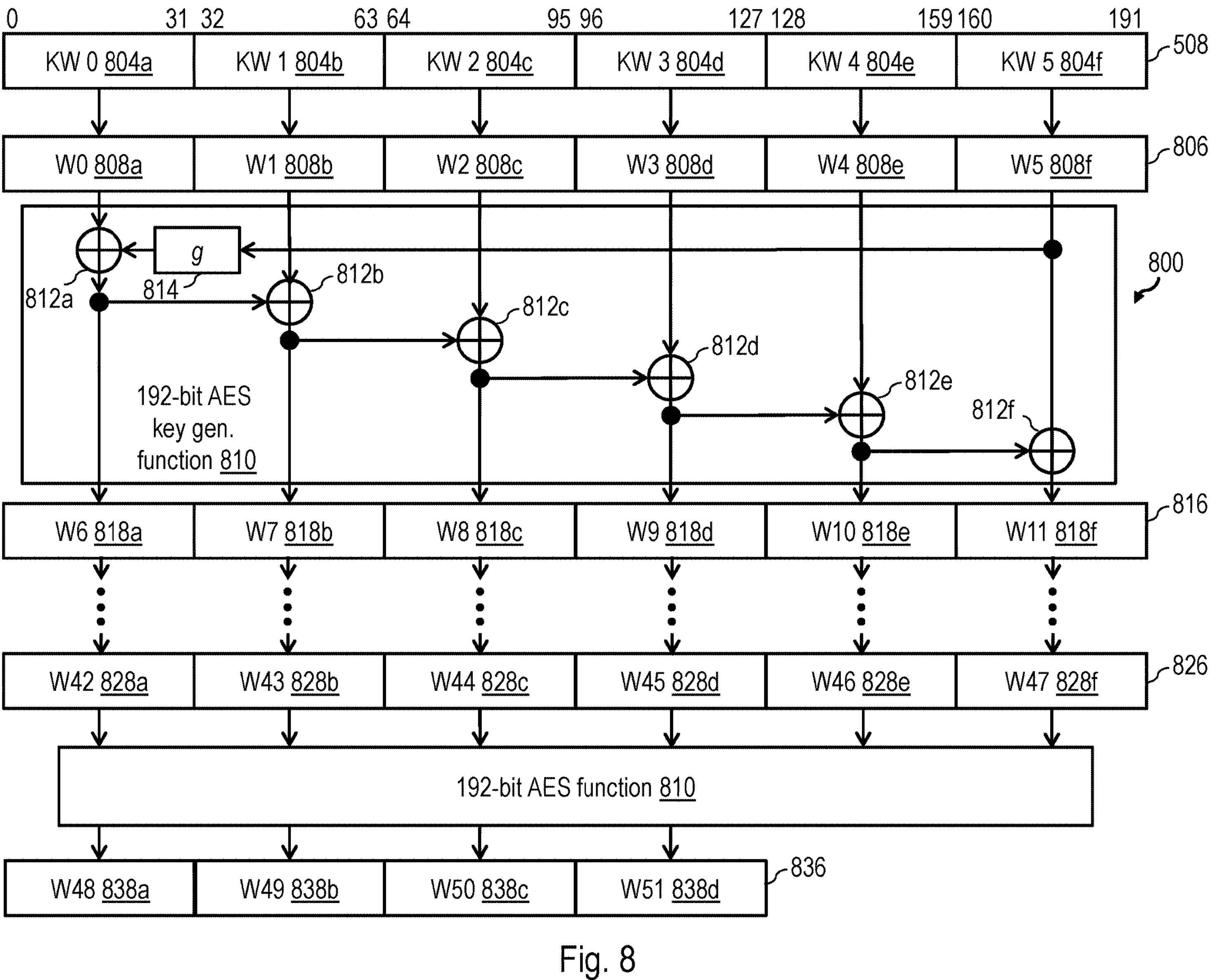
FIG. 8 is a data flow diagram of an AES key generation process for generating 128-bit round keys from an initial 192-bit encryption key in accordance with one embodiment.

Referring now to FIG. 8, there is depicted a more detailed data flow diagram of an AES key generation process 800 for generating 128-bit round keys 510 from an initial 192-bit encryption key 508 in accordance with one embodiment. The reverse of the illustrated data flow can be employed to generate round keys 610 for a 192-bit implementation of the decryption process 600 of FIG. 6.

Key generation process 800 begins with a 192-bit initial encryption key 508. Initial encryption key 508 includes six 32-bit key words, namely, key words (KW) 0 804*a* to KW 5 804*f* which form the six 32-bit words W0 808*a* to W5 808*f* of an initial iteration input 806. Of these, words W0 808*a* to W3 804*d* form an initial round key (i.e., round key 0 510*c*0). Each numerically subsequent group of four 32-bit key words produced by key generation process 800 forms a round key for a subsequent iteration of encryption/decryption processing. Thus, for example, W4 808*e* and W5 808*f* and W6 818*a* and W7 818*b* together form a next 128-bit round key (i.e., round key 1 510*c*1), W8 818*c* to W11 818*f* form the following 128-bit round key, and so on until W48 838*a* to W51 838*d* form a final round key (i.e., round key n 510*cn*). Notably, in the 192-bit process shown in FIG. 8 (as well as the 256-bit process described below with reference to FIG. 9), the round keys do not correspond 1-to-1 with iterations of the relevant AES function (e.g., 192-bit AES function 810) as they do in 128-bit embodiment depicted in FIG. 7.

The 192-bit AES function 810 employed in key generation process 800 can be utilized in the forward direction to perform expand operations 512 of encryption process 500 and in the reverse direction to perform reverse expand operations 612 of decryption process 600. The 192-bit AES function 810 includes, in each of six 32-bit lanes, a respective one of six 32-bit XOR functions 812*a*-812*f*. Each XOR function 812 performs an exclusive OR of a respective 32-bit word of a 192-bit iteration input (which in all but the first iteration is the iteration result produced by a previous iteration of function 810) with bits derived from another 32-bit lane in order to produce an iteration result 816, . . . , 826, 836. Specifically, in the second through sixth lanes, each of XOR functions 812*b*-912*f* performs a 32-bit exclusive OR of the input word in its respective lane with the output of the XOR function 812 in the immediately preceding adjacent lane. In the first lane, XOR function 812*a* performs a 32-bit exclusive OR of the input word in the first lane with the 32-bit output produced by an AES-defined bit-scrambling function g 814 based on the input word of sixth lane.

The process depicted in FIG. 8 continues iteratively to generate additional iteration results, including penultimate iteration result 826 (comprising six 32-bit words W42 828*a* to W47 828*f*) and final iteration result 836 (including four 32-bit words W48 838*a* to W51 838*d*). In total, key generation process 800 of FIG. 8 generates 13 round keys for use in encryption process 500 in eight iterations of 192-bit AES function 810. In accordance with the present invention, during encryption process 500, six 32-bit words from the penultimate and final iterations of 192-bit AES function 810 (i.e., 32-bit words W46 828*e*, W47 828*f*, W48 838*a*, W49 838*b*, W50 838*c*, W51 838*d*) are retained and buffered within architected registers XB and XB+1 as decryption key 514, as generally shown at reference numeral 1002 of FIG. 10B. Again, those skilled in the art will appreciate that the particular ordering of the bits and bytes within architected registers XB and XB+1 is arbitrary and can vary between implementations.

Figure 9:
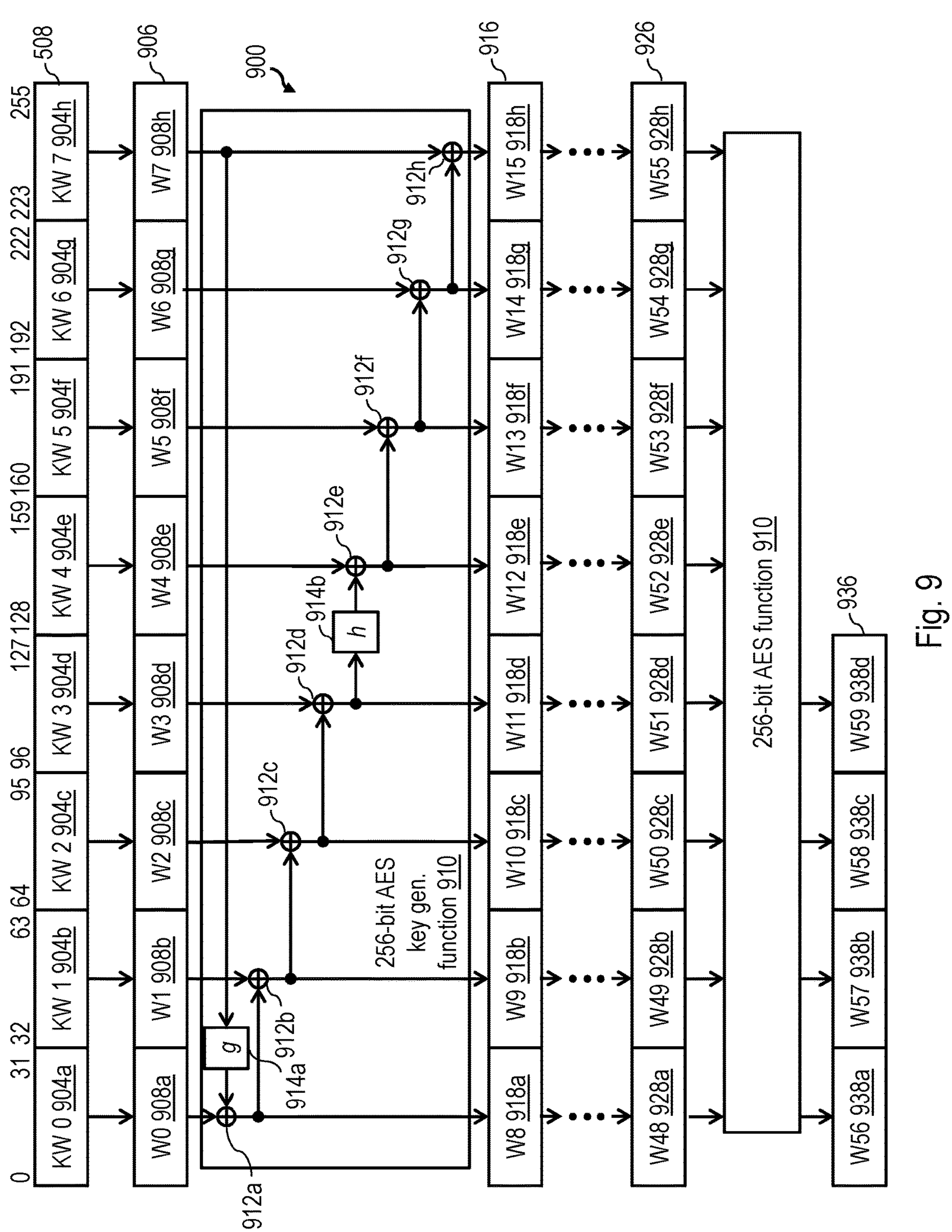
FIG. 9 is a data flow diagram of an AES key generation process for generating 128-bit round keys from an initial 256-bit encryption key in accordance with one embodiment.

With reference now to FIG. 9, there is illustrated a more detailed data flow diagram of an AES key generation process 900 for generating 128-bit round keys 510 from an initial 256-bit encryption key 508 in accordance with one embodiment. The reverse of the illustrated data flow can be employed to generate round keys 610 for a 256-bit implementation of the decryption process 600 of FIG. 6.

Key generation process 900 begins with a 256-bit initial encryption key 508. Initial encryption key 508 includes eight 32-bit key words, namely, key words (KW) 0 904*a* to KW 7 904*h*, which form the eight words W0 908*a* to W5 908*h* of an initial iteration input 906. Of these eight words, words W0 908*a* to W3 908*d* form an initial round key (i.e., round key 0 510*c*0). Each numerically subsequent group of four 32-bit key words produced by key generation process 800 forms a round key for a subsequent iteration of encryption processing. Thus, for example, W4 908*e* to W7 908*f* together form a next 128-bit round key (i.e., round key 1 510*c*1), W8 918*a* to W11 918*d* form the following 128-bit round key, and so on until W56 938*a* to W59 938*d* form a final round key (i.e., round key n 510*cn*). Notably, in the 256-bit process shown in FIG. 9, two 128-bit round keys are produced by each iteration of a 256-bit AES function 910.

The 256-bit AES function 910 employed in key generation process 900 can be utilized in the forward direction to perform expand operations 512 of encryption process 500 and in the reverse direction to perform reverse expand operations 612 of decryption process 600. The 256-bit AES function 910 includes, in each of eight 32-bit lanes, a respective one of eight 32-bit XOR functions 912*a*-912*h*. Each XOR function 912 performs an exclusive OR of a respective 32-bit word of a 256-bit iteration input (which in all but the first iteration is the iteration result of a previous iteration of function 910) with bits derived from another 32-bit lane in order to produce an iteration result 916, . . . , 926, 936. Specifically, in the second through fourth and sixth through eighth lanes, each of XOR functions 912 performs a 32-bit exclusive OR of the input word in its respective lane with the 32-bit output of the XOR function 912 in the immediately preceding adjacent lane. In the first lane, XOR function 912*a* performs a 32-bit exclusive OR of the input word in the first lane with the 32-bit output produced by an AES-defined bit-scrambling function g 914*a* based on the input word of the eighth lane. Similarly, in the fifth lane, XOR function 912*e* performs a 32-bit exclusive OR of the input word in the fifth lane with the 32-bit output produced by an AES-defined bit-scrambling function h 914*b* based on the output of XOR function 912*d* in the fourth lane.

The process depicted in FIG. 9 continues iteratively to generate additional iteration results, including penultimate iteration result 926 (comprising eight 32-bit words W48 928*a* to W55 928*h*) and final iteration result 936 (including four 32-bit words W56 938*a* to W59 938*d*). In total, key generation process 900 of FIG. 9 generates 15 round keys for use in encryption process 500 in seven iterations of 256-bit AES function 910. In accordance with the present invention, during the encryption process 500, eight 32-bit words from of the penultimate and final iterations of 256-bit AES function 910 (i.e., 32-bit words W52 928*e* to W55 928*h* and W56 938*a* to W59 938*d*) are retained and buffered within architected registers XB and XB+1 as decryption key 514, as generally shown at reference numeral 1004 of FIG. 10C. Again, those skilled in the art will appreciate that the particular ordering of the bits and bytes within architected registers XB and XB+1 is arbitrary and can vary between implementations.

Figures 10A, 10B, 10C, 11:
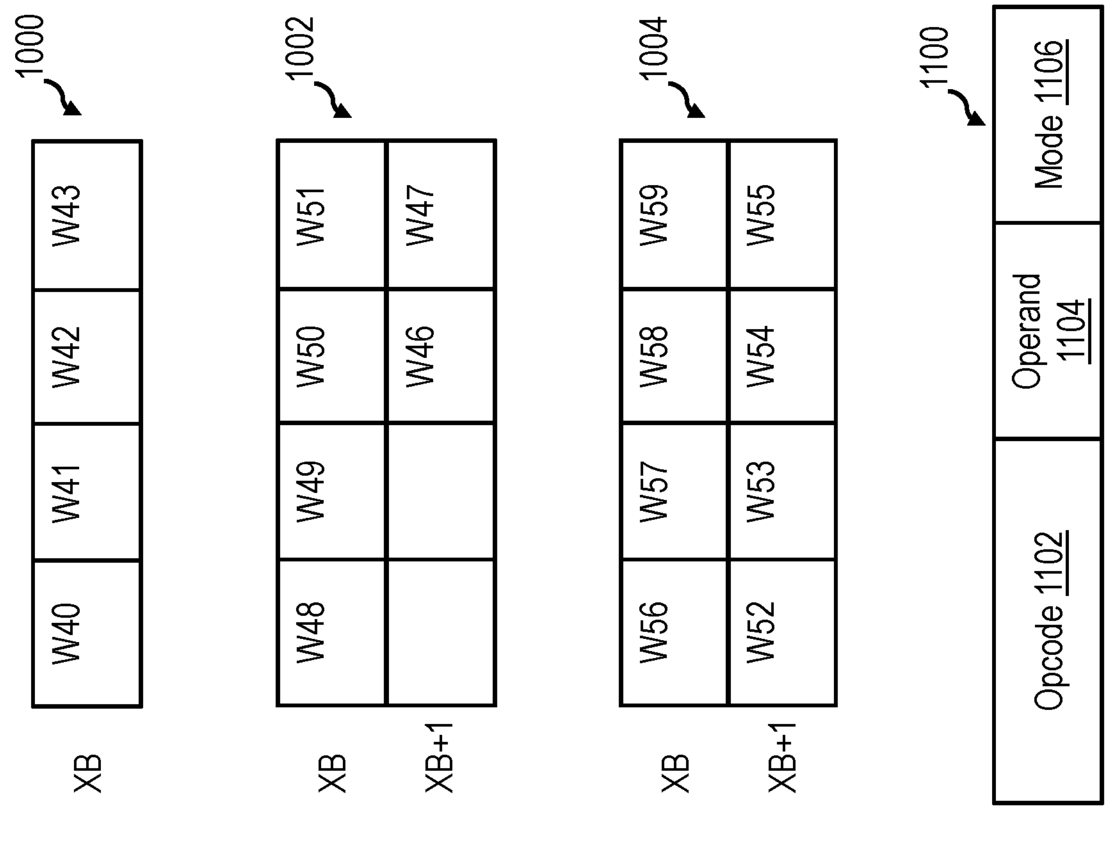
FIGS. 10A-10C respectively illustrate the storage of key words for 128-bit, 192-bit, and 256-bit decryption keys generated in accordance with one embodiment.
FIG. 11 depicts an exemplary key-generating instruction in accordance with one embodiment.

With reference now to FIG. 11, there is illustrated an exemplary key-generating instruction in accordance with one embodiment. In at least one embodiment, vector-scalar unit 226 of a processor core 104 is configured to execute key-generating instruction 1100 to determine the decryption key 514 utilized to decrypt ciphertext encrypted by AES.

In the depicted embodiment, key-generating instruction 1100 includes an opcode field 1102 that specifies the opcode of a key-generating instruction for a given instruction set architecture. Instruction 1100 additionally includes an operand field 1104 utilized to indicate (e.g., via immediate addressing, indexed addressing, logical addresses or other register addressing technique) the architected register(s) 300 (e.g., XA, XA+1) containing the encryption key 508 to be utilized as the starting point to obtain the corresponding decryption key 514 as well as the architected register(s) 300 (e.g., XB, XB+1) for buffering the decryption key 514 at conclusion of execution of key-generating instruction 1100. Instruction 1100 also includes a mode field 1106 that specifies the length (e.g., 128 bits, 192 bits, or 256 bits) of encryption key 508 and decryption key 514.

Figure 12:
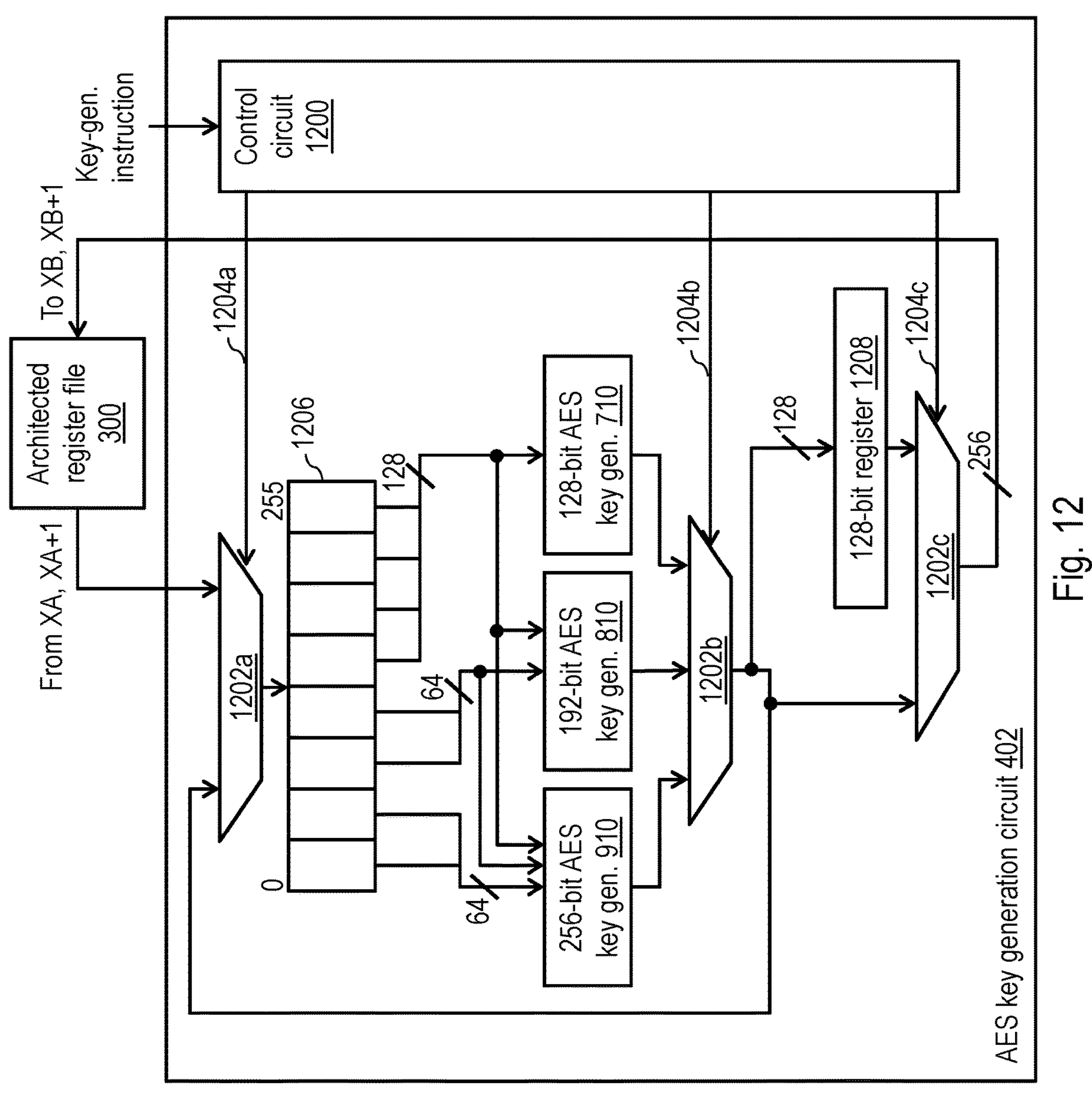
FIG. 12 is a high-level block diagram of an exemplary design of an AES key generation circuit in accordance with one embodiment.

Referring now to FIG. 12, there is depicted a high-level block diagram of an exemplary design of an AES key generation circuit 402 that can be implemented within cryptography unit 308 in accordance with one embodiment. AES key generation circuit 402 can be utilized to execute a key-generating instruction 1100 to generate a decryption key 514 as previously described. Those skilled in the art will appreciate upon reference to the following description that FIG. 12 depicts a logical circuit design rather than an optimized implementation and that, if physically realized as an integrated circuit, some of the components of the depicted logical circuit design can be combined, reused, or overlapped to achieve a more compact implementation.

In the illustrated embodiment, AES key generation circuit 402 includes a control circuit 1200 that receives a key-generating instruction 1100 and, based on the values in instruction fields 1102-1106, controls AES key generation circuit 402 to generate round keys 510 and a decryption key 514 as described above. AES key generation circuit 402 additionally includes a first multiplexer 1202*a* having a first input coupled to receive up to two 128-bit register values from architected register file 300. These 128-bit register value(s), whose storage location(s) XA, XA+1 in architected registers 300 are indicated by operand field 1104, form an encryption key 508. The second input of first multiplexer 1202*a* is coupled to receive the up to 256-bit iteration output present at the output of a second multiplexer 1202*b*. Multiplexer 1202*a* selects from among its two inputs in response to a control signal 1204*a* generated by control circuit 1200 based on the size specified in mode field 1106. Multiplexer 1202*a* is preferably further configured to zero bits of output words that are unused for a given iteration of processing. Thus, for example, multiplexer 1202*a* is preferably controlled by control circuit 1200 to zero four 32-bit words if mode field 1106 specifies the 128-bit mode, and multiplexer 1202*a* is preferably controlled by control circuit 1200 to zero two 32-bit words if mode field 1106 specifies the 192-bit mode.

The output of first multiplexer 1202*a* is loaded into a 256-bit working register 1206, which is coupled to the inputs of a 128-bit AES key generation function 710, 192-bit AES key generation function 810, and 256-bit AES key generation function 910 as described above with respect to FIGS. 7-9. Specifically, the four high-order 32-bit words of working register 1206 are coupled to 128-bit AES key generation function 710, the six high-order 32-bit words of working register 1206 are coupled to 192-bit AES key generation function 810, and all eight 32-bit words of working register 1206 are coupled to 256-bit AES key generation function 910. Each of key generation functions 710, 810, and 910 generates an iteration output, which is received at a respective one of three inputs of second multiplexer 1202*b*. Based on mode field 1106 of the key-generating instruction 1100, control circuit 1200 generates a control signal 1204*b* specifying a selection from among the inputs of second multiplexer 1202*b* to pass to the 256-bit output of second multiplexer 1202*b*.

As noted above, the output of second multiplexer 1202*b* is coupled to one input of first multiplexer 1202*a* to permit the iteration output of one iteration of a key generation function 710, 810, or 910 to be utilized as the iteration input of a subsequent iteration. In addition, the 256-bit output of second multiplexer 1202*b* is coupled to an input of a third multiplexer 1202*c*, and the high-order 128-bits of the output of second multiplexer 1202*b* are coupled to update a 128-bit register 1208, which is in turn coupled to a second input of third multiplexer 1202*c*. At the conclusion of all of the iterations associated with the selected mode of encryption, control circuit 1200 asserts a control signal 1204*c* to control the selection of 32-bit words from among those presented at the inputs of third multiplexer 1202*c* to form decryption key 514. In particular, for 128-bit mode, control signal 1204*c* causes third multiplexer 1202*c* to select the four high-order 32-bit words (i.e., words W40 738*a* to W43 738*d*) from the output of second multiplexer 1202*b* as decryption key 514. For 192-bit mode, control signal 1204*c* controls third multiplexer 1202*c* to select words W46 828*e* and W47 828*f* from 128-bit register 1208 and to select words W48 838*a* to W51 838*d* from the output of second multiplexer 1202*b* to form decryption key 514. For 256-bit mode, control sign 1204*c* directs third multiplexer 1202*c* to select words W52 928*e* to W55 928*h* from 128-bit register 1208 and to select words W56 938*a* to W59 938*d* from the output of second multiplexer 1202*b* to form decryption key 514. As indicated, the up to 256 bits selected by third multiplexer 1202*c* are stored in register XB and, if needed, register XB+1, in architected register file 300 for subsequent low latency access when decrypting ciphertext.

Figure 13:
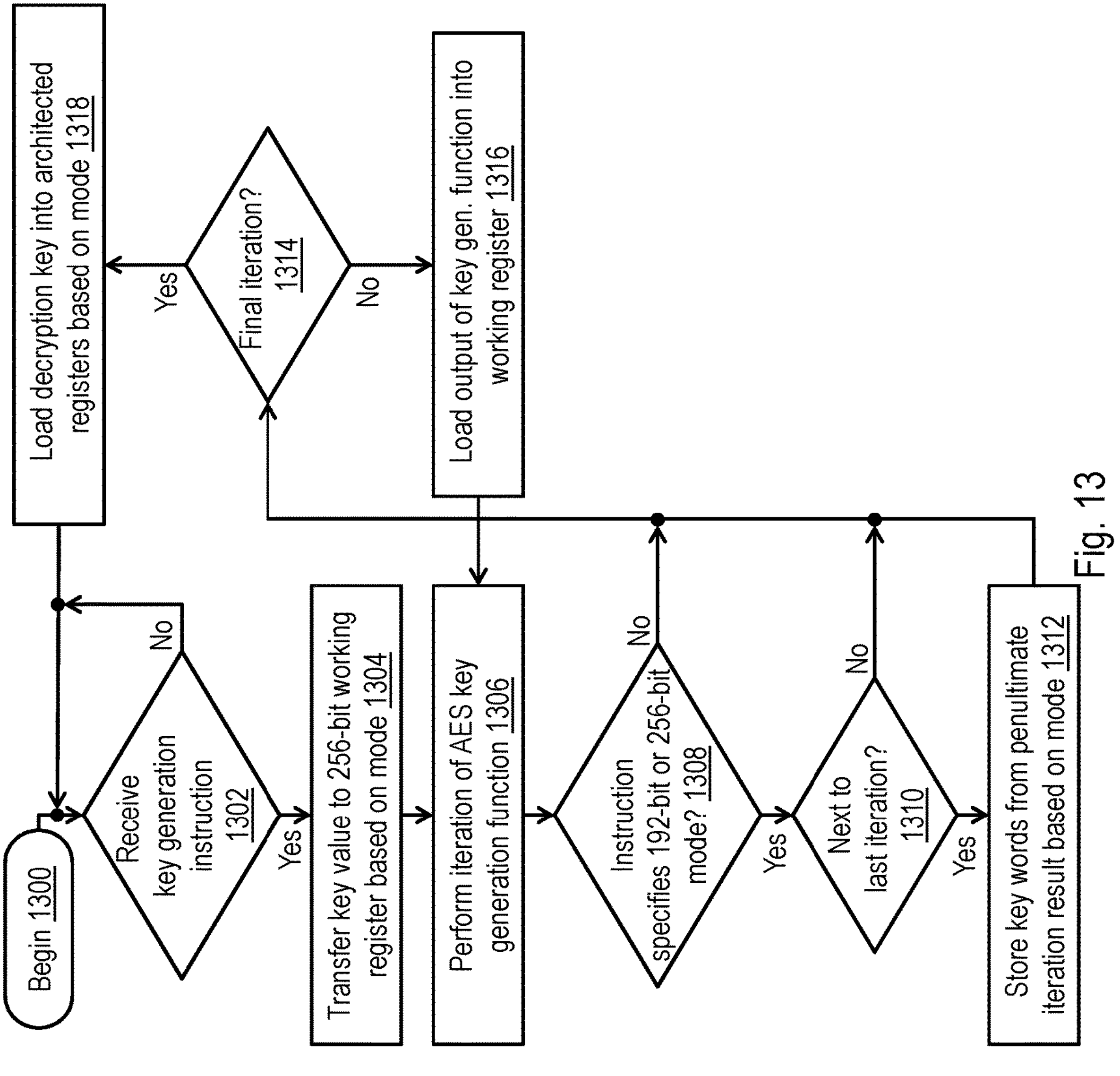
FIG. 13 is a high-level logical flowchart of an exemplary method of generating a decryption key through execution of a key-generating instruction in accordance with one embodiment.

With reference now to FIG. 13, there is illustrated a high-level logical flowchart of an exemplary method of generating a decryption key through execution of a key-generating instruction 1100 in accordance with one embodiment. For purposes of explication rather than limitation, the process of FIG. 13 is described with reference to the exemplary high-level circuit design for AES key generation circuit 402 given in FIG. 12.

The method of FIG. 13 begins at block 1300 and then proceeds to block 1302, which depicts AES key generation circuit 402 awaiting receipt of a key-generating instruction 1100. If no key-generating instruction 1100 is received by AES key generation circuit 402, the process iterates at block 1302. However, in response to receipt of a key-generating instruction 1100 by AES key generation circuit 402, the process proceeds to block 1304. At block 1304, AES key generation circuit 402 initiates a transfer of an encryption key 508 from the registers XA, XA+1 of architected register file 300 indicated by operand field 1104 of key-generating instruction 1100 into 256-bit register 1206. AES key generation circuit 402 then performs an iteration of an AES key generation function utilizing at least a relevant one of AES key generation functions 710, 810, 910 indicated by mode field 1106 of key-generating instruction 1100 (block 1306). As indicated by block 1308, if mode field 1106 of key-generating instruction 1100 specifies 192-bit or 256-bit mode, the process next passes to block 1310; otherwise, if mode field 1106 specifies 128-bit mode, the process proceeds to block 1314, which is described below.

At block 1310, AES key generation circuit 402 determines whether the next-to-last (penultimate) iteration of the AES key generation function 810 or 910 was performed at block 1306. If not, the process passes to block 1314. If, however, AES key generation circuit 402 determines at block 1310 that the penultimate iteration of AES key generation function 810 or 910 was performed at block 1306, AES key generation circuit 402 stores the four high-order 32-bit words of the iteration result in 128-bit register 1208 (block 1312). The process then passes to block 1314.

Block 1314 depicts AES key generation circuit 402 determining whether or not the final iteration of AES key generation function 710, 810 or 910 was performed at block 1306. If not, AES key generation circuit 402 loads the iteration output of the preceding iteration present at the output of second multiplexer 1202*b* into working register 1206 (block 1316). Thereafter, the process of FIG. 13 returns to block 1306 and proceeds iteratively. If, however, AES key generation circuit 402 determines at block 1314 that the final iteration of the AES key generation function 710, 810, or 910 was performed at the most recent traversal of block 1306, AES key generation circuit 402 loads the decryption key 514 generated by the key generation process into register XB, XB+1 of architected register file 300 based on the mode selected by mode field 1106 of key-generating instruction 1100 as described above. Thereafter, the process of FIG. 13 returns to block 1302, which has been described.

Following execution of a key-generating instruction 1100 to determine a decryption key 514 for decrypting ciphertext, cryptography unit 308 may then execute one or more decryption instructions to access the decryption key from the architected register file 300 and decrypt the ciphertext utilizing the decryption key, as described above with reference to FIG. 6. As should be appreciated, by quickly generating the decryption key 514 required to initiate decryption through the execution in hardware of key-generating instruction 1100 and then accessing the decryption key from architected register file 300 at low latency, the decryption of the ciphertext is accelerated.

Figure 14:
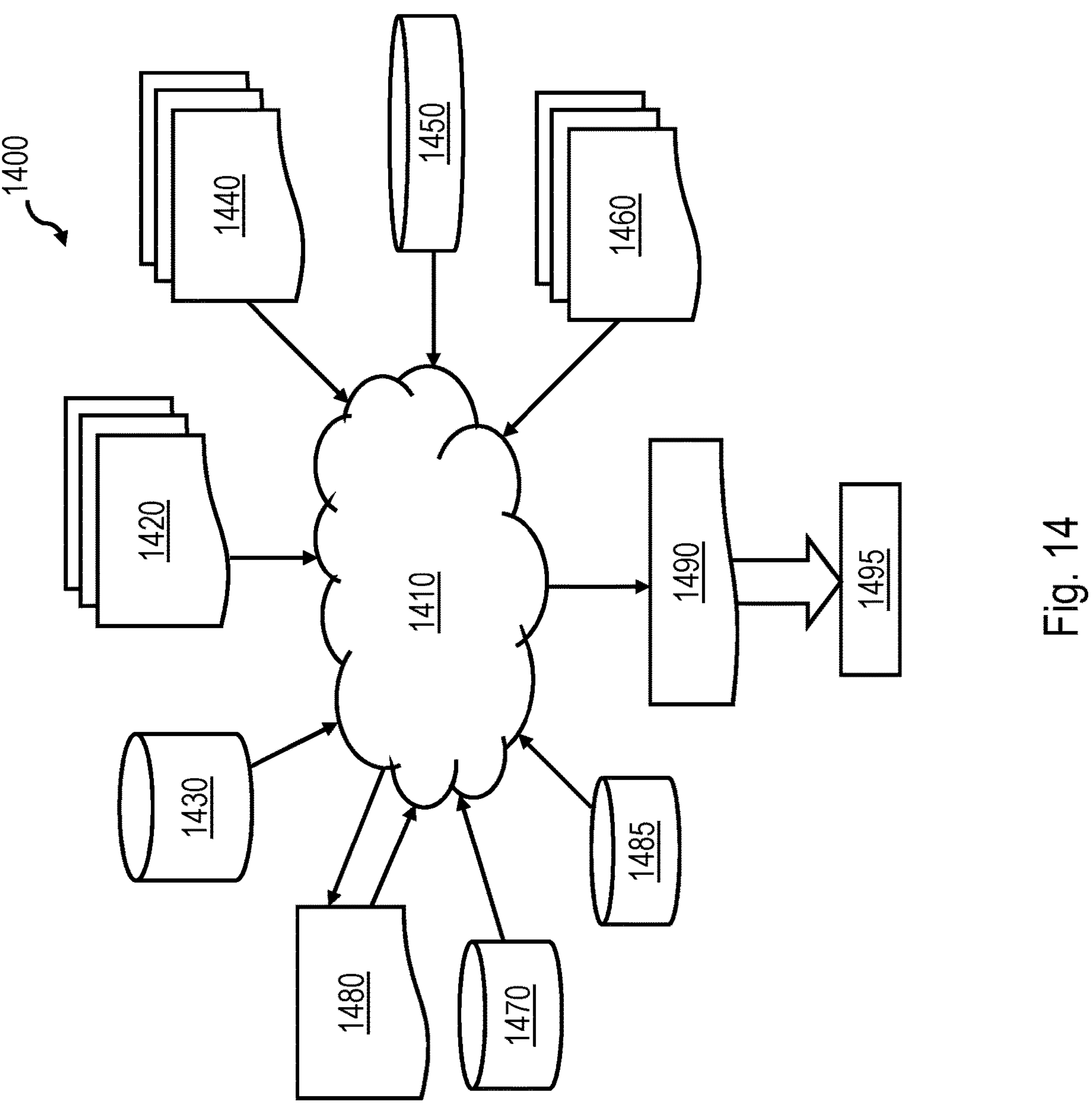
FIG. 14 depicts an exemplary design process in accordance with one embodiment.

With reference now to FIG. 14, there is illustrated a block diagram of an exemplary design flow 1400 used for example, in semiconductor IC logic design, simulation, test, layout, and manufacture. Design flow 1400 includes processes, machines and/or mechanisms for processing design structures or devices to generate logically or otherwise functionally equivalent representations of the design structures and/or devices described above and shown herein. The design structures processed and/or generated by design flow 1400 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1400 may vary depending on the type of representation being designed. For example, a design flow 1400 for building an application specific IC (ASIC) may differ from a design flow 1400 for designing a standard component or from a design flow 1400 for instantiating the design into a programmable array, for example a programmable gate array (PGA) or a field programmable gate array (FPGA) offered by Altera® Inc. or Xilinx® Inc.

FIG. 14 illustrates multiple such design structures including an input design structure 1020 that is preferably processed by a design process 1410. Design structure 1420 may be a logical simulation design structure generated and processed by design process 1410 to produce a logically equivalent functional representation of a hardware device. Design structure 1420 may also or alternatively comprise data and/or program instructions that when processed by design process 1410, generate a functional representation of the physical structure of a hardware device. Whether representing functional and/or structural design features, design structure 1420 may be generated using electronic computer-aided design (ECAD) such as implemented by a core developer/designer. When encoded on a machine-readable data transmission, gate array, or storage medium, design structure 1420 may be accessed and processed by one or more hardware and/or software modules within design process 1410 to simulate or otherwise functionally represent an electronic component, circuit, electronic or logic module, apparatus, device, or system such as those shown herein. As such, design structure 1420 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher-level design languages such as C or C++.

Design process 1410 preferably employs and incorporates hardware and/or software modules for synthesizing, translating, or otherwise processing a design/simulation functional equivalent of the components, circuits, devices, or logic structures shown herein to generate a netlist 1480 which may contain design structures such as design structure 1420. Netlist 1480 may comprise, for example, compiled or otherwise processed data structures representing a list of wires, discrete components, logic gates, control circuits, I/O devices, models, etc. that describes the connections to other elements and circuits in an integrated circuit design. Netlist 1480 may be synthesized using an iterative process in which netlist 1480 is resynthesized one or more times depending on design specifications and parameters for the device. As with other design structure types described herein, netlist 1480 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1410 may include hardware and software modules for processing a variety of input data structure types including netlist 1480. Such data structure types may reside, for example, within library elements 1430 and include a set of commonly used elements, circuits, and devices, including models, layouts, and symbolic representations, for a given manufacturing technology (e.g., different technology nodes, 32 nm, 45 nm, 140 nm, etc.). The data structure types may further include design specifications 1440, characterization data 1450, verification data 1460, design rules 1490, and test data files 1485 which may include input test patterns, output test results, and other testing information. Design process 1410 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1410 without deviating from the scope and spirit of the invention. Design process 1410 may also include modules for performing standard circuit design processes such as timing analysis, verification, design rule checking, place and route operations, etc.

Design process 1410 employs and incorporates logic and physical design tools such as HDL compilers and simulation model build tools to process design structure 1420 together with some or all of the depicted supporting data structures along with any additional mechanical design or data (if applicable), to generate a second design structure 1490. Design structure 1490 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1420, design structure 1490 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1490 may comprise a compiled, executable HDL simulation model that functionally simulates the devices shown herein.

Design structure 1490 may also employ a data format used for the exchange of layout data of integrated circuits and/or symbolic data format (e.g., information stored in a GDSII (GDS2), GL1, OASIS, map files, or any other suitable format for storing such design data structures). Design structure 1490 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1490 may then proceed to a stage 1495 where, for example, design structure 1490: proceeds to tape-out, is released to manufacturing, is released to a mask house, is sent to another design house, is sent back to the customer, etc.

As has been described, in at least one embodiment, a processor includes an instruction fetch unit that fetches instructions to be executed, an architected register file including a plurality of registers for storing source and destination operands, and an execution unit for executing a key-generating instruction. The execution unit includes a key generation circuit that, responsive to a key-generating instruction, iteratively applies a cryptographic function to a sequence of iteration inputs beginning with an encryption key obtained from the architected register file and stores, within the architected register file, a decryption key obtained from at least one iteration of the cryptographic function.

While various embodiments have been particularly shown and described, it will be understood by those skilled in the art that various changes in form and detail may be made therein without departing from the spirit and scope of the appended claims and these alternate implementations all fall within the scope of the appended claims. For example, while the invention has been described with specific reference to AES, those skilled in the art will appreciate that the disclosed inventions are also applicable to other encryption algorithms.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher-level design languages such as C or C++. Furthermore, the data and/or instructions may also employ a data format used for the exchange of layout data of integrated circuits and/or symbolic data format (e.g., information stored in a GDSII (GDS2), GL1, OASIS, map files, or any other suitable format for storing such design data structures).

What is claimed is:

1. A processor, comprising:

an instruction fetch circuit configured to fetch instructions;

an architected register file including a plurality of registers for storing source and destination operands; and an execution unit for executing a key-generating instruction including an operand field, wherein the execution unit includes a key generation circuit, including:

a working register for buffering a plurality of words of differing lengths;

a plurality of different advanced encryption standard (AES) key generation function circuits each coupled to receive a respective set of words from the working register, wherein the set of words that each of the plurality of AES key generation function circuits is coupled to receive from the working register differs from the set of words of that any other of the plurality of AES key generation function circuits is coupled to receive from the working register, each of the plurality of different key generation circuits having a corresponding output;

a selection circuit coupled to select between the corresponding outputs of the plurality of different AES key generation function circuits for storage in the working register;

output circuitry; and a control circuit that, responsive to a key-generating instruction, causes one of the plurality of different AES key generation function circuits and the selection circuit to iteratively apply a cryptographic function to a sequence of iteration inputs beginning with an encryption key obtained from at least one source register within the architected register file indicated by the operand field and further causes the output circuitry to store, within at least one destination register within the architected register file indicated by the operand field, a decryption key obtained from at least one iteration of the cryptographic function wherein the decryption key is configured for decrypting ciphertext encrypted utilizing the encryption key;

wherein a first of the plurality of different AES key generation function circuits implements a different key generation function than a second of the plurality of different AES key generation function circuits; and wherein the first of the plurality of different AES key generation function circuits implements a key generation function for a first key length and the second of the plurality of different AES key generation function circuits implements a key generation function for a second key length different from the first key length.

2. The processor of claim 1, wherein:

the key-generating instruction includes a mode field specifying one of a plurality of modes each corresponding to a respective one of a plurality of different lengths of decryption keys; and the execution unit is configured to generate the decryption key with any one of the plurality of different lengths based on the mode field of the key-generating instruction.

3. The processor of claim 1, wherein:

the key-generating instruction includes a mode field specifying one of a plurality of modes each corresponding to a respective one of a plurality of different lengths of decryption keys; and the execution unit is configured to generate the decryption key utilizing differing numbers of iterations of the cryptographic function based on the mode field of the key-generating instruction.

4. The processor of claim 1, wherein the cryptographic function comprises an Advanced Encryption Standard cryptographic function.

5. The processor of claim 1, wherein:

the execution unit is further configured, based on receipt of a decryption instruction, to access the decryption key from the architected register file and decrypt ciphertext encrypted by the encryption key utilizing the decryption key.

6. A data processing system, comprising:

multiple processors, including the processor of claim 1;

a shared memory; and a system interconnect communicatively coupling the shared memory and the multiple processors.

7. A method of data processing in a processor, said method comprising:

receiving, by an execution unit of the processor, a key-generating instruction including an operand field, wherein the execution unit includes a key generation circuit, including:

a working register for buffering a plurality of words of differing lengths;

a plurality of different Advanced Encryption Standard (AES) key generation function circuits each coupled to receive a respective set of words from the working register, wherein the respective set of words each of the plurality of AES key generation function circuits is coupled to receive from the working register differs from any of the plurality of AES key generation function circuits, each of the plurality of different key generation circuits having a corresponding output;

selection circuitry coupled to select between the corresponding outputs of the plurality of different AES key generation function circuits for storage in the working register;

output circuitry; and a control circuit; and based on receiving the key-generating instruction, the execution unit executing the key-generating instruction, wherein the executing includes the control circuit causing one of the plurality of different AES key generation function circuits and the selection circuitry to iteratively apply a cryptographic function to a sequence of iteration inputs beginning with an encryption key obtained from at least one source register within an architected register file of the processor and storing, within the architected register file, a decryption key obtained from at least one iteration of the cryptographic function, wherein the decryption key is configured for decrypting ciphertext encrypted utilizing the encryption key;

wherein a first of the plurality of different AES key generation function circuits implements a different key generation function than a second of the plurality of different AES key generation function circuits; and wherein the first of the plurality of different AES key generation function circuits implements a key generation function for a first key length and the second of the plurality of different AES key generation function circuits implements a key generation function for a second key length different from the first key length.

8. The method of claim 7, wherein:

the key-generating instruction includes a mode field specifying one of a plurality of modes each corresponding to a respective one of a plurality of different lengths of decryption keys; and the executing includes the execution unit generating the decryption key with one of the plurality of different lengths in accordance with the mode field of the key-generating instruction.

9. The method of claim 7, wherein:

the key-generating instruction includes a mode field specifying one of a plurality of modes each corresponding to a respective one of a plurality of different lengths of decryption keys; and the executing includes the execution unit generating the decryption key utilizing a selected number of iterations among differing numbers of iterations of the cryptographic function based on the mode field of the key-generating instruction.

10. The method of claim 7, wherein the cryptographic function comprises an Advanced Encryption Standard cryptographic function.

11. The method of claim 7, wherein:

the instructions further include a decryption instruction; and the method further includes the execution unit, based on receipt of a decryption instruction, accessing the decryption key from the architected register file and decrypting ciphertext encrypted by the encryption key utilizing the decryption key.

12. A design structure tangibly embodied in a machine-readable storage device for designing, manufacturing, or testing an integrated circuit, the design structure comprising:

a processor, including:

an instruction fetch circuit configured to fetch instructions;

an architected register file including a plurality of registers for storing source and destination operands; and an execution unit for executing a key-generating instruction including an operand field, wherein the execution unit includes a key generation circuit, including:

a working register for buffering a plurality of words of differing lengths;

a plurality of different Advanced Encryption Standard (AES) key generation function circuits each coupled to receive a respective set of words from the working register, wherein the respective set of words each of the plurality of AES key generation function circuits is coupled to receive from the working register differs from any other of the plurality of AES key generation function circuits, each of the plurality of different key generation circuits having a corresponding output;

selection circuitry coupled to select between the corresponding outputs of the plurality of different AES key generation function circuits for storage in the working register;

output circuitry; and a control circuit that, responsive to a key-generating instruction, causes one of the plurality of different AES key generation function circuits and the selection circuitry to iteratively apply a cryptographic function to a sequence of iteration inputs beginning with an encryption key obtained from at least one source register within the architected register file indicated by the operand field, wherein a decryption key is configured for decrypting ciphertext encrypted utilizing the encryption key;

wherein a first of the plurality of different AES key generation function circuits implements a different key generation function than a second of the plurality of different AES key generation function circuits; and wherein the first of the plurality of different AES key generation function circuits implements a first key generation function for a first key length and the second of the plurality of different AES key generation function circuits implements a second key generation function for a second key length different from the first key length.

13. The design structure of claim 12, wherein:

the key-generating instruction includes a mode field specifying one of a plurality of modes each corresponding to a respective one of a plurality of different lengths of decryption keys; and the execution unit is configured to generate the decryption key with any one of the plurality of different lengths based on the mode field of the key-generating instruction.

14. The design structure of claim 12, wherein:

the key-generating instruction includes a mode field specifying one of a plurality of modes each corresponding to a respective one of a plurality of different lengths of decryption keys; and the execution unit is configured to generate the decryption key utilizing differing numbers of iterations of the cryptographic function based on the mode field of the key-generating instruction.

15. The design structure of claim 12, wherein the cryptographic function comprises an Advanced Encryption Standard cryptographic function.

16. The design structure of claim 12, wherein:

the execution unit is further configured, based on receipt of a decryption instruction, to access the decryption key from the architected register file and decrypt ciphertext encrypted by the encryption key utilizing the decryption key.

* * * * *